(12) United States Patent
Ueda et al.

(10) Patent No.: US 11,460,029 B2
(45) Date of Patent: Oct. 4, 2022

(54) COMPRESSOR

(71) Applicant: FUJITSU GENERAL LIMITED, Kanagawa (JP)

(72) Inventors: Kenshi Ueda, Kanagawa (JP); Naoya Morozumi, Kanagawa (JP); Akira Inoue, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 94 days.

(21) Appl. No.: 16/957,916

(22) PCT Filed: Dec. 14, 2018

(86) PCT No.: PCT/JP2018/046095
§ 371 (c)(1),
(2) Date: Jun. 25, 2020

(87) PCT Pub. No.: WO2019/131214
PCT Pub. Date: Jul. 4, 2019

(65) Prior Publication Data
US 2021/0363993 A1    Nov. 25, 2021

(30) Foreign Application Priority Data
Dec. 28, 2017  (JP) .............................. JP2017-253660

(51) Int. Cl.
*F04C 29/02* (2006.01)
*F04C 23/00* (2006.01)

(52) U.S. Cl.
CPC .......... *F04C 29/028* (2013.01); *F04C 23/008* (2013.01); *F04C 29/026* (2013.01); *F04C 2240/30* (2013.01); *F04C 2240/40* (2013.01)

(58) Field of Classification Search
CPC ................. F04C 2240/30; F04C 2240/40; F04C 29/026; F04C 29/028; F04C 29/045; F04C 23/008; H02K 1/32
See application file for complete search history.

(56) References Cited

U.S. PATENT DOCUMENTS

2009/0293534 A1* 12/2009 Tanaka .................. F04C 29/026
                                                    62/470
2014/0134014 A1*  5/2014 Mera ........................ H02K 1/32
                                                    417/371

FOREIGN PATENT DOCUMENTS

CN    101145704 A    3/2008
JP    2003-228395 A  8/2003
(Continued)

OTHER PUBLICATIONS

Dec. 21, 2021, Chinese Office Action issued for related CN Application No. 201880084128.7.

*Primary Examiner* — Mark A Laurenzi
*Assistant Examiner* — Xiaoting Hu
(74) *Attorney, Agent, or Firm* — Paratus Law Group, PLLC

(57) ABSTRACT

The compressor includes a rotor that applies rotational power to a compressor unit, wherein the rotor includes a rotor core and an upper rotor-end plate, the rotor core has a plurality of through-holes through which a refrigerant passes, the upper rotor-end plate covers the upper rotor-end face of the rotor core, where one end of each of the plurality of through-holes is formed, the upper rotor-end plate has a plurality of upper openings that allow communication of the plurality of through-holes with an internal space in a compressor container, the plurality of upper openings are adjacent to the plurality of through-holes in the upper rotor-end face, and a plurality of upper inner peripheral-side adjacent areas, which are on the inner peripheral-side closer to a (Continued)

rotation axis than the plurality of through-holes, are exposed to the internal space.

4 Claims, 13 Drawing Sheets

(56) References Cited

FOREIGN PATENT DOCUMENTS

| | | |
|---|---|---|
| JP | 2011-241750 A | 12/2011 |
| JP | 2013-138542 A | 7/2013 |
| JP | 2014-098357 A | 5/2014 |
| JP | 2016-096670 A | 5/2016 |
| JP | 2017-008949 A | 1/2017 |

* cited by examiner

COMPRESSOR

CROSS REFERENCE TO PRIOR APPLICATION

This application is a National Stage Patent Application of PCT International Patent Application No. PCT/JP2018/046095 (filed on Dec. 14, 2018) under 35 U.S.C. § 371, which claims priority to Japanese Patent Application No. 2017-253660 (filed on Dec. 28, 2017), which are all hereby incorporated by reference in their entirety.

FIELD

The technology of the present disclosure relates to a compressor.

BACKGROUND

A hermetic type compressor in which a compressor unit and a motor unit are housed in a hermetic container is known. The motor unit includes a stator and a rotor. The stator rotates the rotor by generating a rotating magnetic field. The compressor unit compresses a refrigerant by rotation of the rotor. The rotor has a plurality of through-holes through which the refrigerant compressed by the compressor unit passes. Refrigerating machine oil that lubricates the compressor unit is stored in the hermetic container, passes through the plurality of through-holes together with the refrigerant compressed by the compressor unit, and is discharged into the subsequent apparatus together with the refrigerant. Such a compressor inhibits the refrigerating machine oil from passing through the plurality of through-holes, thereby preventing the refrigerating machine oil stored in the hermetic container from decreasing, thus making it possible to lubricate the compressor unit appropriately (See Patent Literatures 1 and 2).

CITATION LIST

Patent Literatures

Patent Literature 1: Japanese Laid-open Patent Publication No. 2003-228395
Patent Literature 2: Japanese Laid-open Patent Publication No. 2011-241750

SUMMARY

Technical Problem

However, such a compressor suffers from a problem in that, when the refrigerating machine oil is inhibited from passing through the plurality of through-holes, channel resistance when the refrigerant passes through them also increases, resulting in a decrease in the efficiency of the refrigeration cycle apparatus provided with this compressor.

The disclosed technology has been made in view of the foregoing problem, and an object of the present disclosure is to provide a compressor that decreases channel resistance when a refrigerant passes through a through-hole formed in a rotor.

Solution to Problem

According to an aspect of an embodiment, a compressor includes a rotor, a stator that rotates the rotor about a rotation axis, a compressor unit that compresses a refrigerant by rotation of the rotor, and a hermetic container that forms an internal space in which the rotor, the stator, and the compressor unit are housed, wherein the rotor has a rotor core that has a plurality of holes through which the refrigerant passes, a first-end plate that covers a first-end face of the rotor core in which one end of each of the plurality of holes is formed, and a second-end plate that covers a second-end face of the rotor core in which another end of each of the plurality of holes is formed, the first-end plate has a first opening allowing communication of the plurality of holes with the internal space, the second-end plate has a second opening allowing communication of the plurality of holes with the internal space, and at least one of the first opening or the second opening exposes an area of the first-end face or second-end face, the area being closer to the rotation axis than the plurality of holes, to the internal space.

Advantageous Effects of Invention

The disclosed compressor can reduce channel resistance when a refrigerant passes through a through-hole formed in a rotor.

DESCRIPTION OF EMBODIMENTS

With reference to the drawings, a compressor according to embodiments disclosed in the present application will be described below. The technology of the present disclosure is not limited by the following descriptions. In the following descriptions, the same components will be labeled with the same symbol and a duplicate explanation thereof will be omitted.

First Embodiment

Figure 1:
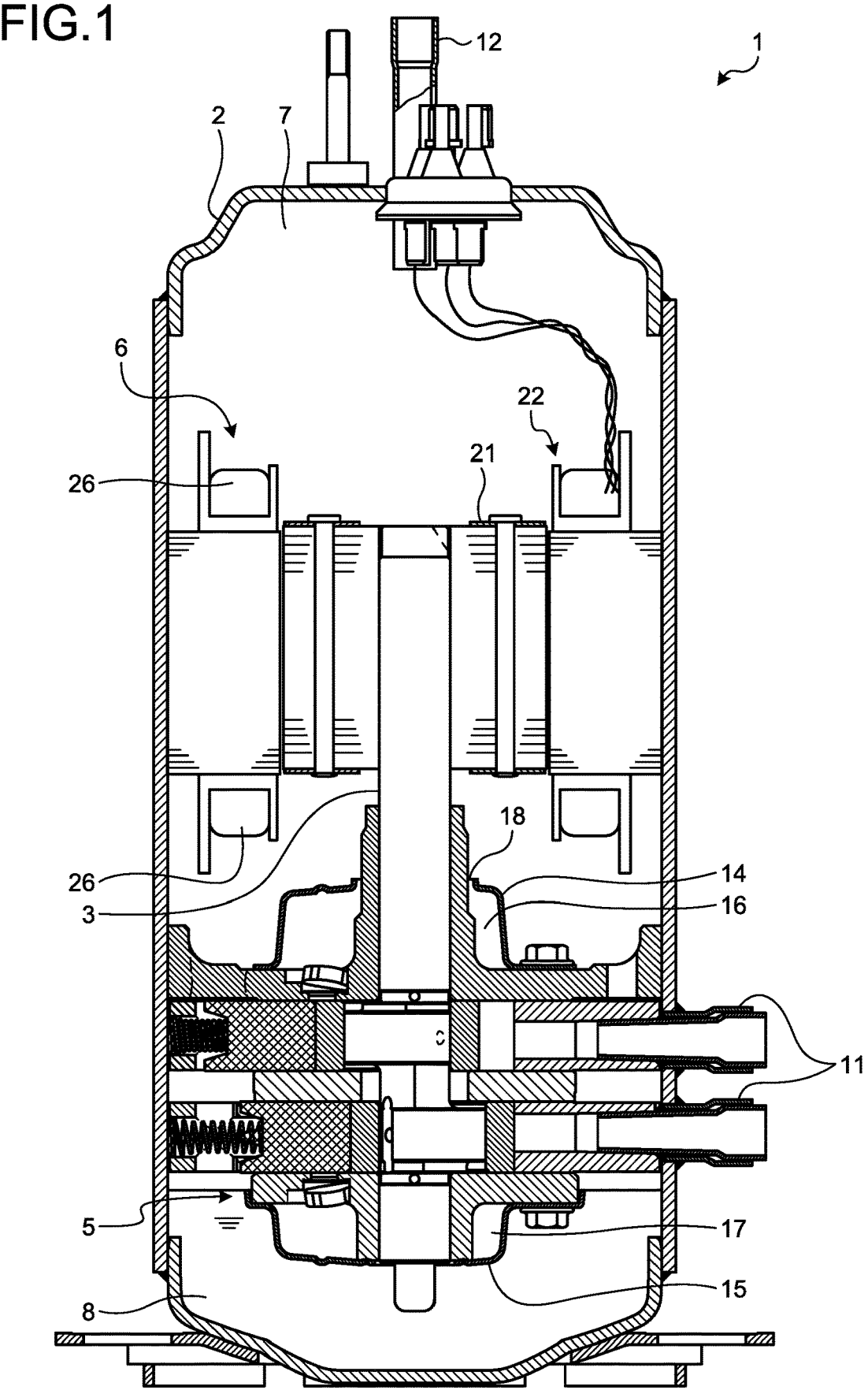
FIG. 1 is a vertical sectional view illustrating a compressor according to a first embodiment.

FIG. 1 is a vertical cross-sectional view illustrating a compressor 1 according to the first embodiment. As illustrated in FIG. 1, the compressor 1 includes a container 2, a shaft 3, a compressor unit 5 and a motor unit 6. The container 2 forms a hermetic internal space 7. The internal space 7 is formed in a substantially cylindrical shape. The compressor 1 is formed such that when the container 2 is vertically placed on a horizontal surface, the axis of the cylindrical shape of the internal space 7 is parallel to a vertical direction. In the container 2, an oil sump 8 is formed in the lower part of the internal space 7. Refrigerating machine oil for lubricating the compressor unit 5 is stored in the oil sump 8. A suction pipe 11 and a discharge pipe 12 are connected to the container 2. The shaft 3 is formed in a rod shape and is arranged in the internal space 7 of the container 2 such that one end thereof is disposed in the oil sump 8. The shaft 3 is supported by the container 2 so as to be rotatable around a rotation axis that is parallel to the axis of the cylindrical shape of the internal space 7. The shaft 3 rotates, thereby supplying the refrigerating machine oil, stored in the oil sump 8, to the compressor unit 5.

The compressor unit 5 is disposed in the lower part of the internal space 7 and above the oil sump 8. The compressor 1 further includes an upper muffler cover 14 and a lower muffler cover 15. The upper muffler cover 14 is disposed in the upper part of the compressor unit 5 in the internal space 7. The upper muffler cover 14 forms an upper muffler chamber 16 inside. The lower muffler cover 15 is disposed in the lower part of the compressor unit 5 in the internal space 7 and disposed above the oil sump 8. The lower muffler cover 15 forms a lower muffler chamber 17 inside. The lower muffler chamber 17 communicates with the upper muffler chamber 16 via a communication passage (not illustrated) formed in the compressor unit 5. A compressed refrigerant discharge hole 18 is formed between the upper muffler cover 14 and the shaft 3, and the upper muffler chamber 16 communicates with the internal space 7 via the compressed refrigerant discharge hole 18.

The compressor unit 5 is a so-called rotary type compressor, in which the shaft 3 rotates to compress the refrigerant supplied from the suction pipes 11, and the compressed refrigerant is supplied to the upper muffler chamber 16 and the lower muffler chamber 17. The refrigerant is compatible with the refrigerating machine oil.

The motor unit 6 is arranged above the compressor unit 5 in the internal space 7. The motor unit 6 includes a rotor 21 and a stator 22. The rotor 21 is fixed to the shaft 3. The stator 22 is formed in a substantially cylindrical shape, is disposed so as to surround the rotor 21, and is fixed to the container 2. The stator 22 includes a coil 26. The stator 22 rotates the rotor 21 by generating a rotating magnetic field by the appropriate application of single-phase and three-phase voltages to the coils 26.

[Rotor 21]

Figure 2:
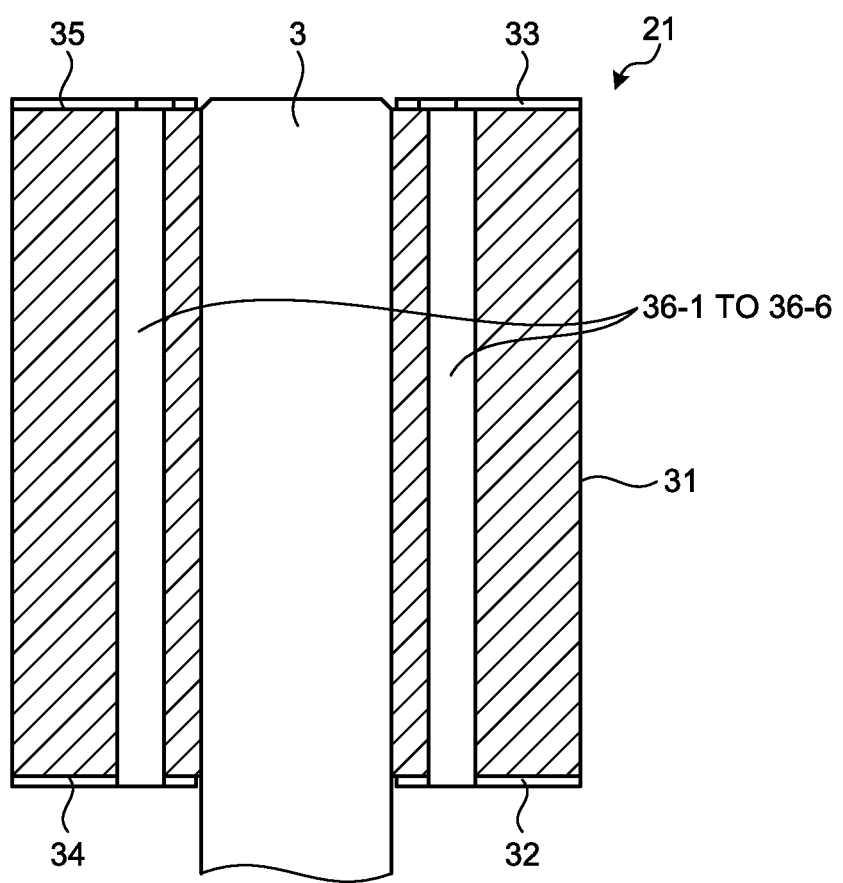
FIG. 2 is a cross-sectional view illustrating the rotor of the compressor of the first embodiment.

FIG. 2 is a sectional view illustrating the rotor 21 of the compressor 1 of the first embodiment. As illustrated in FIG. 2, the rotor 21 includes a rotor core 31, a lower rotor-end plate 32, and an upper rotor-end plate 33. The rotor core 31 is formed in a substantially cylindrical shape and is formed by layering a plurality of steel plates formed of a soft magnetic material such as a silicon steel plate. The rotor core 31 is fixed to the shaft 3 such that the axis of the cylinder formed by the rotor core 31 coincides with the rotation axis of the shaft 3. The rotor core 31 further includes a lower rotor-end face 34, an upper rotor-end face 35, and a plurality of through-holes 36-1 to 36-6. The lower rotor-end face 34 is formed at a portion corresponding to one end surface of the cylinder formed by the rotor core 31 and is formed at a portion, facing the compressor unit 5, of the rotor core 31. The upper rotor-end face 35 is formed at a portion corresponding to the other end surface of the cylinder formed by the rotor core 31 and is formed on the opposite side of the lower rotor-end face 34 of the rotor core 31. The plurality of through-holes 36-1 to 36-6 are formed in parallel with the rotation axis of the shaft 3 and are arranged at equal intervals around the shaft 3. The plurality of through-holes 36-1 to 36-6 are formed so as to pass through the lower rotor-end face 34 and the upper rotor-end face 35.

The lower rotor-end plate 32 is formed in a substantially disc shape. The lower rotor-end plate 32 is in close contact with the lower rotor-end face 34 so as to cover the lower rotor-end face 34 of the rotor core 31 and is fixed to the rotor core 31. The upper rotor-end plate 33 is formed in a substantially disc shape. The upper rotor-end plate 33 is in close contact with the upper rotor-end face 35 so as to cover the upper rotor-end face 35 of the rotor core 31 and is fixed to the rotor core 31.

The rotor 21 further includes a permanent magnet and a balancer (not illustrated). The permanent magnet and the balancer are fixed to the rotor core 31 by fixing the lower rotor-end plate 32 and the upper rotor-end plate 33 to the rotor core 31. The permanent magnet is provided such that the rotor 21 is rotated by a rotating magnetic field generated by the stator 22. The balancer is provided such that the rotor 21 rotates about the rotation axis, that is, the center of gravity of the rotor 21 coincides with the rotation axis of the shaft 3.

Figure 3A:
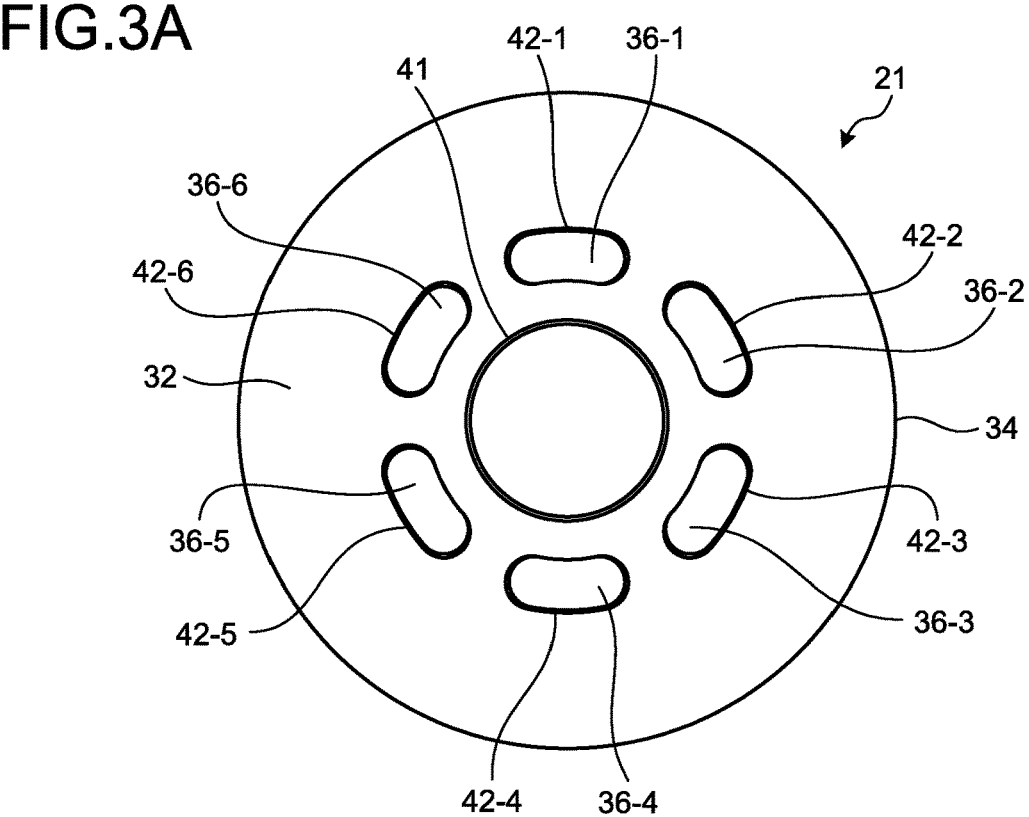
FIG. 3A is a bottom view illustrating the rotor of the compressor of the first embodiment.
Figure 3B:
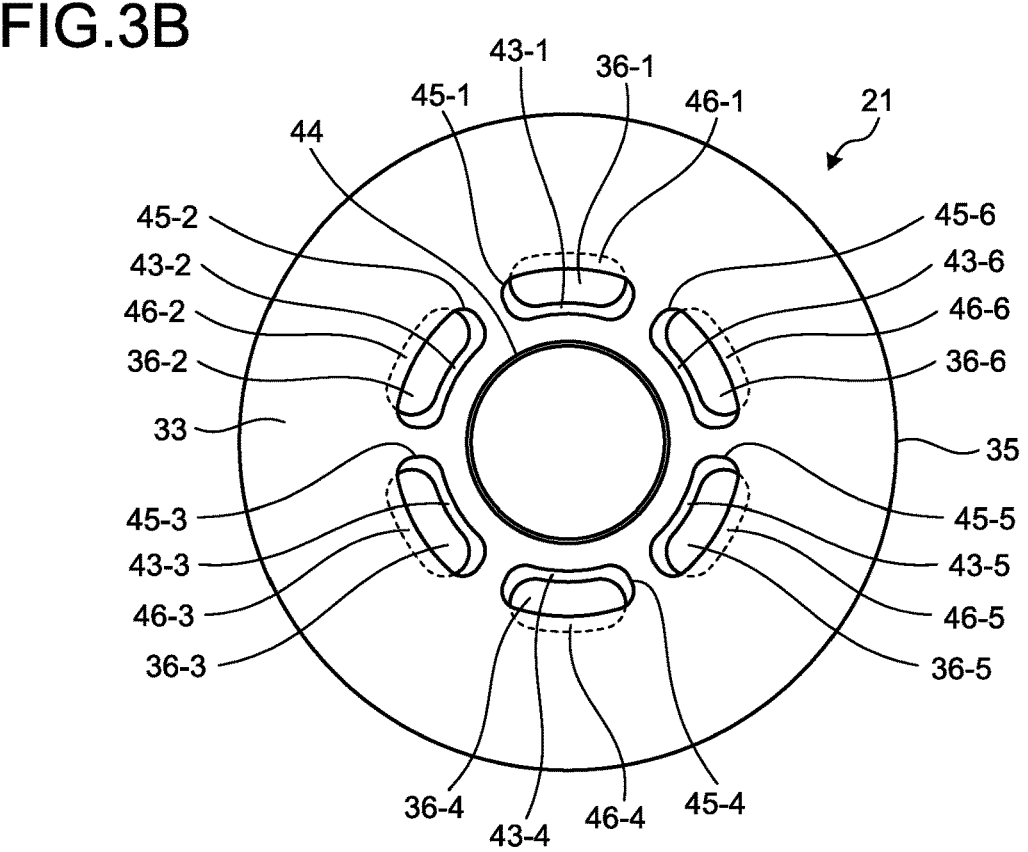
FIG. 3B is a top view illustrating the rotor of the compressor of the first embodiment.

FIG. 3A is a bottom view illustrating the rotor 21 of the compressor 1 of the first embodiment, and FIG. 3B is a top view illustrating the rotor 21 of the compressor 1 of the first embodiment. As illustrated in FIG. 3A, the lower rotor-end plate 32 has a lower center hole 41 and a plurality of lower openings 42-1 to 42-6. The lower center hole 41 is formed in the center of the lower rotor-end plate 32. The shaft 3 passes through the lower center hole 41 when the rotor 21 is fixed to the shaft 3.

The plurality of lower openings 42-1 to 42-6 are formed around the lower center hole 41. The plurality of lower openings 42-1 to 42-6 are formed to have the same shape as the cross section of the plurality of through-holes 36-1 to 36-6 crossing a plane orthogonal to the rotation axis of the shaft 3. In the plurality of lower openings 42-1 to 42-6, the lower ends, on the lower rotor-end face 34 side, of the plurality of through-holes 36-1 to 36-6 respectively are open to the internal space 7, thus allowing communication of the plurality of through-holes 36-1 to 36-6 with the internal space 7. In addition, the lower rotor-end plate 32 covers all of areas adjacent to the plurality of through-holes 36-1 to 36-6 of the lower rotor-end face 34.

That is, in the first lower opening 42-1 of the plurality of lower openings 42-1 to 42-6, the lower rotor-end face 34 side entire lower end of the first through-hole 36-1 of the plurality of through-holes 36-1 to 36-6 is open to the internal space 7. In the second lower opening 42-2 of the plurality of lower openings 42-1 to 42-6, the entire lower end of the second through-hole 36-2 of the plurality of through-holes 36-1 to 36-6 is open to the internal space 7. In the third lower opening 42-3 of the plurality of lower openings 42-1 to 42-6, the entire lower end of the third through-hole 36-3 of the plurality of through-holes 36-1 to 36-6 is open to the internal space 7.

In the fourth lower opening 42-4 of the plurality of lower openings 42-1 to 42-6, the entire lower end of the fourth through-hole 36-4 of the plurality of through-holes 36-1 to 36-6 is open to the internal space 7. In the fifth lower opening 42-5 of the plurality of lower openings 42-1 to 42-6, the entire lower end of the fifth through-hole 36-5 of the plurality of through-holes 36-1 to 36-6 is open to the internal space 7. In the sixth lower opening 42-6 of the plurality of lower openings 42-1 to 42-6, the entire lower end of the sixth through-hole 36-6 of the plurality of through-holes 36-1 to 36-6 is open to the internal space 7.

The upper rotor-end face 35 includes a plurality of upper inner peripheral-side adjacent areas 43-1 to 43-6, as illustrated in FIG. 3B. The plurality of upper inner peripheral-side adjacent areas 43-1 to 43-6 are arranged on the inner peripheral-side closer to the rotation axis of the shaft 3 than the plurality of through-holes 36-1 to 36-6, respectively, and are adjacent to the upper ends of the plurality of through-holes 36-1 to 36-6, respectively. The upper rotor-end plate 33 has an upper center hole 44, a plurality of upper openings 45-1 to 45-6, and a plurality of protrusions 46-1 to 46-6. The upper center hole 44 is formed in the center of the upper rotor-end plate 33. The upper center hole 44 exposes the upper end of the shaft 3 to the internal space 7 when the rotor 21 is fixed to the shaft 3.

The plurality of upper openings 45-1 to 45-6 are formed around the upper center hole 44. In the plurality of upper openings 45-1 to 45-6, inner peripheral-side parts of the upper rotor-end face 35 side upper ends of the plurality of through-holes 36-1 to 36-6 are respectively open to the internal space 7, thus respectively allowing communication of the plurality of through-holes 36-1 to 36-6 with the internal space 7. In addition, the plurality of upper openings 45-1 to 45-6 respectively expose the plurality of upper inner peripheral-side adjacent areas 43-1 to 43-6 to the internal space 7.

The plurality of protrusions 46-1 to 46-6 are arranged on the outer peripheral-side, far from the rotation axis of the shaft 3, of the plurality of upper openings 45-1 to 45-6, respectively. The plurality of protrusions 46-1 to 46-6 respectively cover outer peripheral-side parts of the upper rotor-end face 35 side upper ends of the plurality of through-holes 36-1 to 36-6.

That is, the first upper inner peripheral-side adjacent area 43-1 of the plurality of upper inner peripheral-side adjacent areas 43-1 to 43-6 is disposed on the inner peripheral-side of the upper end of the first through-hole 36-1 and is adjacent to the first through-hole 36-1. In the first upper opening 45-1 of the plurality of upper openings 45-1 to 45-6, inner peripheral-side part of the upper rotor-end face 35 side upper end of the first through-hole 36-1 is open to the internal space 7, thus allowing communication of the first through-hole 36-1 with the internal space 7. The first upper opening 45-1 exposes the first upper inner peripheral-side adjacent area 43-1 to the internal space 7. The first protrusion 46-1 of the plurality of protrusions 46-1 to 46-6 covers outer peripheral-side part of the upper end of the first through-hole 36-1.

The second upper inner peripheral-side adjacent area 43-2 of the plurality of upper inner peripheral-side adjacent areas 43-1 to 43-6 is disposed on the inner peripheral-side of the upper end of the second through-hole 36-2 and is adjacent to the second through-hole 36-2. In the second upper opening 45-2 of the plurality of upper openings 45-1 to 45-6, inner peripheral-side part of the upper end of the second through-hole 36-2 is open to the internal space 7, thus allowing communication of the second through-hole 36-2 with the internal space 7. The second upper opening 45-2 exposes the second upper inner peripheral-side adjacent area 43-2 to the internal space 7. The second protrusion 46-2 of the plurality of protrusions 46-1 to 46-6 covers outer peripheral-side part of the upper end of the second through-hole 36-2.

The third upper inner peripheral-side adjacent area 43-3 of the plurality of upper inner peripheral-side adjacent areas 43-1 to 43-6 is disposed on the inner peripheral-side of the upper end of the third through-hole 36-3 and is adjacent to the third through-hole 36-3. In the third upper opening 45-3 of the plurality of upper openings 45-1 to 45-6, inner peripheral-side part of the upper end of the third through-hole 36-3 is open to the internal space 7, thus allowing communication of the third through-hole 36-3 with the internal space 7. The third upper opening 45-3 exposes the third upper inner peripheral-side adjacent area 43-3 to the internal space 7. The third protrusion 46-3 of the plurality of protrusions 46-1 to 46-6 covers outer peripheral-side part of the upper end of the third through-hole 36-3.

The fourth upper inner peripheral-side adjacent area 43-4 of the plurality of upper inner peripheral-side adjacent areas 43-1 to 43-6 is disposed on the inner peripheral-side of the upper end of the fourth through-hole 36-4 and is adjacent to the fourth through-hole 36-4. In the fourth upper opening 45-4 of the plurality of upper openings 45-1 to 45-6, inner peripheral-side part of the upper end of the fourth through-hole 36-4 is open to the internal space 7, thus allowing communication of the fourth through-hole 36-4 with the internal space 7. The fourth upper opening 45-4 exposes the fourth upper inner peripheral-side adjacent area 43-4 to the internal space 7. The fourth protrusion 46-4 of the plurality of protrusions 46-1 to 46-6 covers outer peripheral-side part of the upper end of the fourth through-hole 36-4.

The fifth upper inner peripheral-side adjacent area 43-5 of the plurality of upper inner peripheral-side adjacent areas 43-1 to 43-6 is disposed on the inner peripheral-side of the upper end of the fifth through-hole 36-5 and is adjacent to the fifth through-hole 36-5. In the fifth upper opening 45-5 of the plurality of upper openings 45-1 to 45-6, inner peripheral-side part of the upper end of the fifth through-hole 36-5 is open to the internal space 7, thus allowing communication of the fifth through-hole 36-5 with the internal space 7. The fifth upper opening 45-5 exposes the fifth upper inner peripheral-side adjacent area 43-5 to the internal space 7. The fifth protrusion 46-5 of the plurality of protrusions 46-1 to 46-6 covers outer peripheral-side part of the upper end of the fifth through-hole 36-5.

The sixth upper inner peripheral-side adjacent area 43-6 of the plurality of upper inner peripheral-side adjacent areas 43-1 to 43-6 is disposed on the inner peripheral-side of the upper end of the sixth through-hole 36-6 and is adjacent to the sixth through-hole 36-6. In the sixth upper opening 45-6 of the plurality of upper openings 45-1 to 45-6, inner peripheral-side part of the upper end of the sixth through-hole 36-6 is open to the internal space 7, thus allowing communication of the sixth through-hole 36-6 with the internal space 7. The sixth upper opening 45-6 exposes the sixth upper inner peripheral-side adjacent area 43-6 to the internal space 7. The sixth protrusion 46-6 of the plurality of protrusions 46-1 to 46-6 covers outer peripheral-side part of the upper end of the sixth through-hole 36-6.

[Operation of the Compressor 1]

The compressor 1 is provided in a refrigeration cycle apparatus (not illustrated) and is used to compress a refrigerant and circulate the refrigerant in the refrigeration cycle apparatus. The motor unit 6 of the compressor 1 generates a rotating magnetic field by applying a three-phase voltage to the coils 26 of the stator 22. The rotor 21 is rotated by the rotating magnetic field generated by the stator 22, and the shaft 3 is thereby rotated.

When the shaft 3 rotates, the compressor unit 5 sucks low-pressure refrigerant gas through the suction pipes 11, the sucked low-pressure refrigerant gas is compressed to generate high-pressure refrigerant gas, and the high-pressure refrigerant gas is supplied to the upper muffler chamber 16 and the lower muffler chamber 17. The lower muffler cover 15 reduces the pressure pulsation of the high-pressure refrigerant gas supplied to the lower muffler chamber 17 and supplies the high-pressure refrigerant gas with the reduced pressure pulsation to the upper muffler chamber 16. The upper muffler cover 14 reduces the pressure pulsation of the high-pressure refrigerant gas supplied to the upper muffler chamber 16 and supplies the high-pressure refrigerant gas with the reduced pressure pulsation to the space between the compressor unit 5 and motor unit 6 in the internal space 7 through the compressed refrigerant discharge hole 18. The high-pressure refrigerant gas supplied to the space between the compressor unit 5 and motor unit 6 in the internal space 7 passes through the plurality of through-holes 36-1 to 36-6 and is thereby supplied to the space above the motor unit 6 in the internal space 7. The refrigerant supplied to the space above the motor unit 6 in the internal space 7 is discharged, through the discharge pipe 12, to an apparatus subsequent to the refrigeration cycle apparatus.

Figure 4:
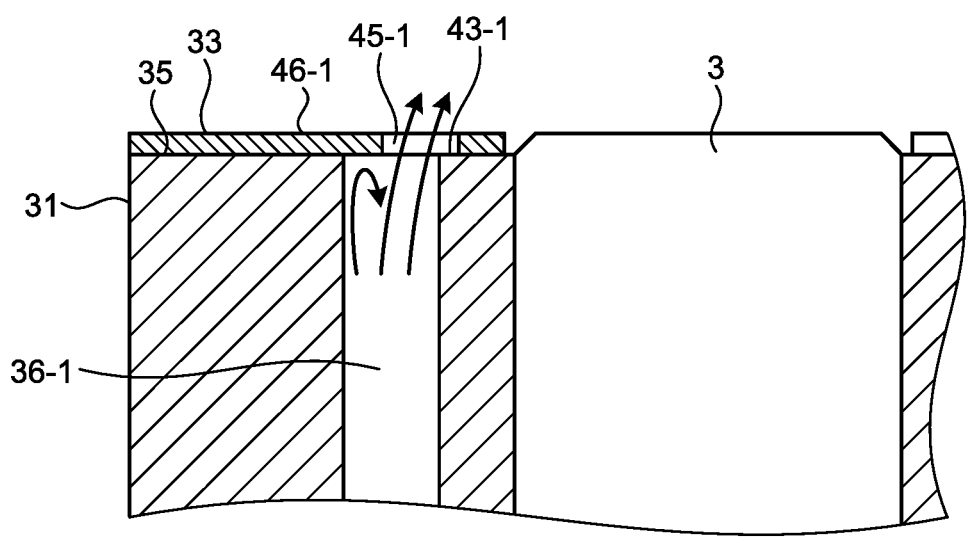
FIG. 4 is an enlarged cross-sectional view illustrating the vicinity of the upper end of a first through-hole.

FIG. 4 is an enlarged cross-sectional view illustrating the vicinity of the upper end of the first through-hole 36-1. When the high-pressure refrigerant gas passes through the first through-hole 36-1, the high pressure refrigerant gas collides with the first protrusion 46-1 as illustrated in FIG. 4 and thereby obliquely flows out toward the rotation axis of the shaft 3 from the upper end of the first through-hole 36-1. Because the upper inner peripheral-side adjacent area 43-1 is exposed to the internal space 7, the upper rotor-end plate 33 is less likely to interfere with the high-pressure refrigerant gas obliquely flowing out toward the rotation axis of the shaft 3 from the upper end of the first through-hole 36-1. Consequently, the motor unit 6 can reduce resistance received when the high-pressure refrigerant gas obliquely flows out toward the rotation axis of the shaft 3 from the upper end of the first through-hole 36-1 and can reduce pressure loss when the high-pressure refrigerant gas flows out from the first through-hole 36-1. In the motor unit 6, because the upper inner peripheral-side adjacent area 43-1 is exposed to the internal space 7, a channel connecting the lower part and the upper part of the motor unit 6 via the first through-hole 36-1 can be shortened by an amount corresponding the thickness of the upper rotor-end plate 33. By virtue of the shortened channel, the motor unit 6 can reduce the channel resistance of the high-pressure refrigerant gas passing through the channel and can reduce pressure loss when the high-pressure refrigerant gas passes through the channel. Also regarding the other through-holes different from the first through-hole 36-1 among the plurality of through-holes 36-1 to 36-6, pressure loss when the high-pressure refrigerant gas passes through the channels connecting the lower part and the upper part of the motor unit 6 can be reduced similarly to the first through-hole 36-1. The compressor 1 reduces pressure loss when the high-pressure refrigerant gas passes through the channels thereof, thereby inhibiting a decrease in the pressure of the refrigerant discharged into the subsequent apparatus, thus making it possible to compress the refrigerant highly efficiently.

The refrigerating machine oil stored in the oil sump 8 is supplied to the compressor unit 5 by rotation of the shaft 3 and is used as a lubricating oil that reduces friction acting between mechanical elements composing the compressor unit 5. When the compressor unit 5 compresses a low-pressure refrigerant gas to produce the high-pressure refrigerant gas, the refrigerating machine oil is mixed with the high-pressure refrigerant gas, and the mixture is supplied to the space between the motor unit 6 and the compressor unit 5 in the internal space 7. In addition, the refrigerating machine oil is further discharged into the space between the motor unit 6 and compressor unit 5 in the internal space 7 by rotation of the shaft 3 and is mixed with the high pressure refrigerant gas. Some of the refrigerating machine oil supplied to the space between the motor unit 6 and compressor unit 5 in the internal space 7 passes through the plurality of through-holes 36-1 to 36-6 together with the high-pressure refrigerant gas and is thereby supplied to the space above the motor unit 6 in the internal space 7. The refrigerant supplied to the space above the motor unit 6 in the internal space 7 is discharged, through the discharge pipe 12, to the apparatus subsequent to the refrigeration cycle apparatus together with the high-pressure refrigerant gas.

When the refrigerating machine oil passes through the plurality of through-holes 36-1 to 36-6 together with the high-pressure refrigerant gas, this oil collides with the plurality of protrusions 46-1 to 46-6 and is separated from the refrigerant within the plurality of through-holes 36-1 to 36-6. By virtue of rotation of the rotor 21, the refrigerating machine oil separated from the refrigerant within the plurality of through-holes 36-1 to 36-6 moves to the outer peripheral-sides of the plurality of through-holes 36-1 to 36-6 by means of centrifugal force and accumulates on the outer peripheral-sides of the plurality of through-holes 36-1 to 36-6. Some of the refrigerating machine oil accumulated on the outer peripheral-sides of the plurality of through-holes 36-1 to 36-6 is supplied to the space between the motor unit 6 and compressor unit 5 in the internal space 7 because all of the lower ends of the plurality of through-holes 36-1 to 36-6 are open. The plurality of protrusions 46-1 to 46-6 respectively cover outer peripheral-side parts of the upper ends of the plurality of through-holes 36-1 to 36-6, thereby inhibiting the refrigerating machine oil accumulated on the outer peripheral-sides of the plurality of through-holes 36-1 to 36-6 from being supplied to the space above the motor unit 6 in the internal space 7. In the compressor 1, the refrigerating machine oil is inhibited from being supplied to the space above the motor unit 6 in the internal space 7, and thereby an amount of refrigerating machine oil discharged into the subsequent apparatus through the discharge pipe 12 together with the refrigerant is reduced. In the compressor 1, the amount of refrigerating machine oil discharged into the subsequent apparatus is reduced, thereby making it possible to prevent a decrease in an amount of refrigerating machine oil stored in the container 2. In the compressor 1, the refrigerating machine oil stored in the container 2 is prevented from decreasing, thereby making it possible to appropriately supply the lubricating oil to the compressor unit 5 and appropriately lubricate the compressor unit 5. Moreover, the compressor 1 can improve the heat exchange efficiency of the heat exchanger of the refrigeration cycle apparatus by reducing the amount of oil discharged.

Advantageous Effects of Compressor 1 of First Embodiment

The compressor 1 according to the first embodiment includes the rotor 21, the stator 22 that rotates the rotor 21 about the rotation axis, the compressor unit 5 that compresses a refrigerant by rotation of the rotor 21, and the container 2 forming the internal space 7 in which the rotor 21, the stator 22, and the compressor unit 5 are housed. The rotor 21 includes the rotor core 31, the upper rotor-end plate 33 (first-end plate), and the lower rotor-end plate 32 (second-end plate). The rotor core 31 has the plurality of through-holes 36-1 to 36-6 through which the refrigerant passes. The upper rotor-end plate 33 covers the upper rotor-end face 35 (first-end face), where the upper ends of the plurality of through-holes 36-1 to 36-6 are formed, of the rotor core 31. The lower rotor-end plate 32 covers the lower rotor-end face 34 (second end face), where the lower ends of the plurality of through-holes 36-1 to 36-6 are formed, of the rotor core 31. The upper rotor-end plate 33 has the plurality of upper openings 45-1 to 45-6 (first openings) that allow the plurality of through-holes 36-1 to 36-6 to communicate with the internal space 7. The lower rotor-end plate 32 has the plurality of lower openings 42-1 to 42-6 (second openings) that allow the plurality of through-holes 36-1 to 36-6 to communicate with the internal space 7. The plurality of upper openings 45-1 to 45-6 expose the plurality of upper inner peripheral-side adjacent areas 43-1 to 43-6 of the upper rotor-end face 35 to the internal space 7. The plurality of upper inner peripheral-side adjacent areas 43-1 to 43-6 are adjacent to the upper ends of the plurality of through-holes 36-1 to 36-6 and arranged on the side closer to the rotation axis of the shaft 3 than the upper ends of the plurality of through-holes 36-1 to 36-6.

In such a compressor 1, because the plurality of upper inner peripheral-side adjacent areas 43-1 to 43-6 are exposed to the internal space 7, the channel connecting the lower part and the upper part of the motor unit 6 via the plurality of through-holes 36-1 to 36-6 can be shortened by the amount corresponding to the thickness of the upper rotor-end plate 33. Therefore, in the compressor 1, because the plurality of upper inner peripheral-side adjacent areas 43-1 to 43-6 are exposed to the internal space 7, the channel resistance of the high pressure refrigerant gas passing through the channel is reduced, and pressure loss when a high-pressure refrigerant gas passes through the motor unit 6 can be reduced. In the compressor 1, the pressure loss when the high-pressure refrigerant gas passes through the motor unit 6 is reduced, thereby making it possible to compress the refrigerant highly efficiently. By compressing the refrigerant highly efficiently, the compressor 1 can improve the efficiency of the refrigeration cycle in which the compressor 1 is provided.

In addition, the upper rotor-end plate 33 of the compressor 1 of the first embodiment has the plurality of protrusions 46-1 to 46-6 respectively covering the outer peripheral-side parts of the upper rotor-end face 35 side upper ends of the plurality of through-holes 36-1 to 36-6. When a refrigerating machine oil mixed with the refrigerant passes through the plurality of through-holes 36-1 to 36-6, this oil collides with the plurality of protrusions 46-1 to 46-6 and is separated from refrigerant within the plurality of through-holes 36-1 to 36-6. By virtue of rotation of the rotor 21, the refrigerating machine oil separated from the refrigerant within the plurality of through-holes 36-1 to 36-6 moves to the outer peripheral-sides of the plurality of through-holes 36-1 to 36-6 by means of centrifugal force and accumulates on the outer peripheral-sides of the plurality of through-holes 36-1 to 36-6. In such a compressor 1, the plurality of protrusions 46-1 to 46-6 are formed, and thereby the refrigerating machine oil accumulated on the outer peripheral-sides of the plurality of through-holes 36-1 to 36-6 is inhibited from flowing out above the motor unit 6 in the internal space 7. By virtue of this, the compressor 1 reduces the amount of refrigerating machine oil supplied above the motor unit 6 in the internal space 7, making it possible to reduce the amount of refrigerating machine oil discharged into the subsequent apparatus together with the refrigerant. In the compressor 1, even when the plurality of protrusions 46-1 to 46-6 are formed, the plurality of upper inner peripheral-side adjacent areas 43-1 to 43-6 of the upper rotor-end face 35 are exposed to the internal space 7, thereby making it possible to inhibit an increase in pressure loss of the high-pressure refrigerant gas passing through the motor unit 6.

Second Embodiment

Figure 5A:
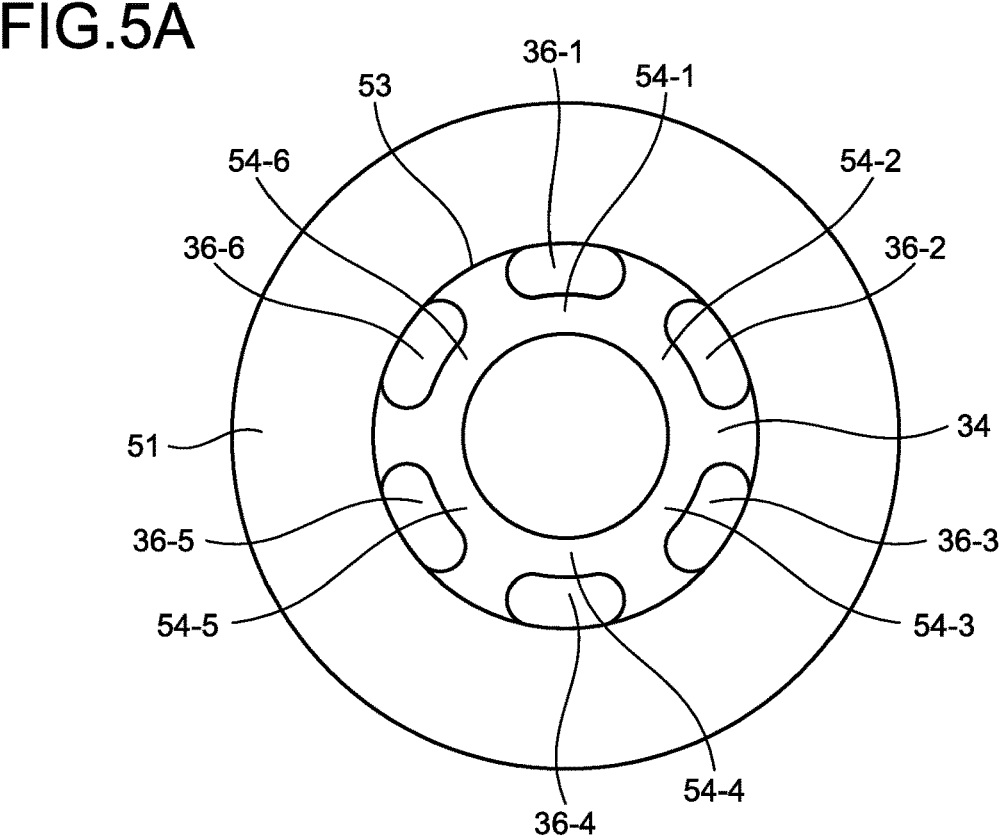
FIG. 5A is a bottom view illustrating the rotor of a compressor of the second embodiment.
Figure 5B:
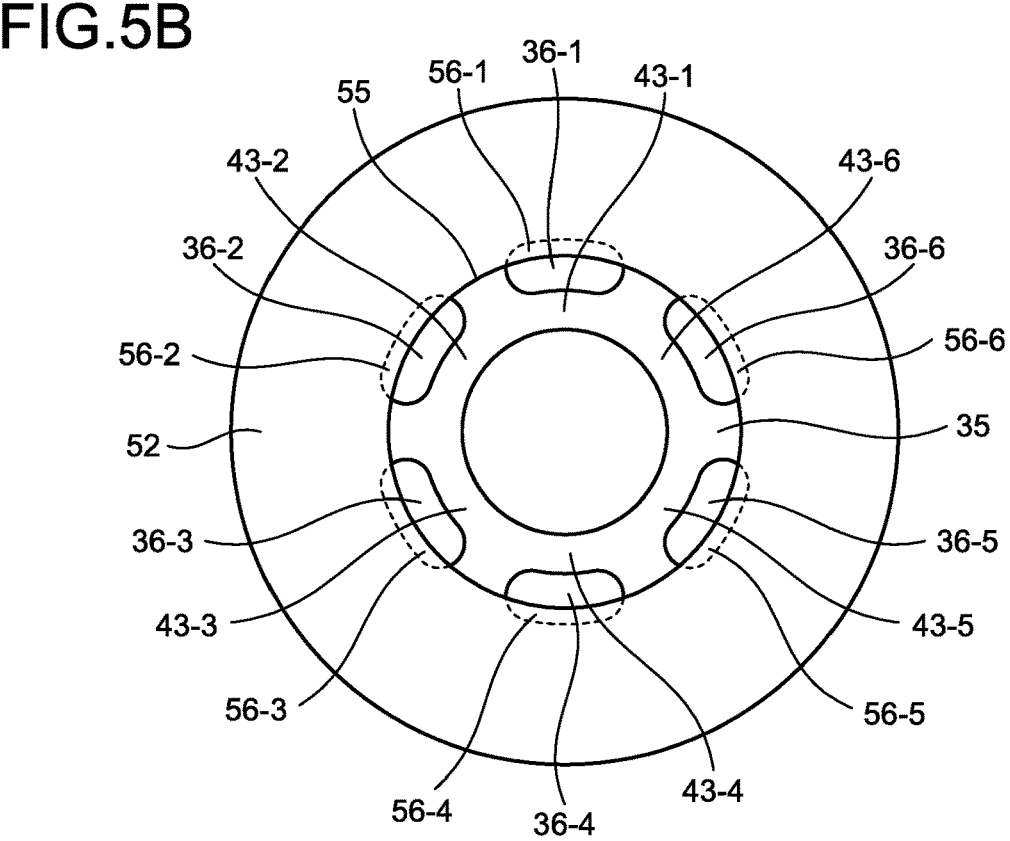
FIG. 5B is a top view illustrating the rotor of the compressor of the second embodiment.

As illustrated in FIG. 5, in a compressor of the second embodiment, the lower rotor-end plate 32 of the compressor 1 of the first embodiment described above is replaced by a lower rotor-end plate 51, and the upper rotor-end plate 33 is replaced by an upper rotor-end plate 52. FIG. 5A is a bottom view illustrating a rotor 21 of the compressor of the second embodiment, and FIG. 5B is a top view illustrating the rotor 21 of the compressor of the second embodiment. As illustrated in FIG. 5A, the lower rotor-end plate 51 has a lower opening 53 formed therein. The lower opening 53 is formed in a circular shape. A shaft 3 passes through the lower opening 53 when the rotor 21 is fixed to the shaft 3. In the lower opening 53, all of the lower ends, on a lower rotor-end face 34 side, of the plurality of through-holes 36-1 to 36-6 are open to an internal space 7, thus respectively allowing communication of a plurality of through-holes 36-1 to 36-6 with the internal space 7.

The lower rotor-end face 34 includes a plurality of lower inner peripheral-side adjacent areas 54-1 to 54-6. The plurality of lower inner peripheral-side adjacent areas 54-1 to 54-6 are arranged closer to the inner peripheral-side than the plurality of through-holes 36-1 to 36-6, respectively and are adjacent to the plurality of through-holes 36-1 to 36-6, respectively. That is, the first lower inner peripheral-side adjacent area 54-1 of the plurality of lower inner peripheral-side adjacent areas 54-1 to 54-6 is disposed closer to the inner peripheral-side than the first through-hole 36-1 and is adjacent to the first through-hole 36-1. The second lower inner peripheral-side adjacent area 54-2 of the plurality of lower inner peripheral-side adjacent areas 54-1 to 54-6 is disposed closer to the inner peripheral-side than the second through-hole 36-2 and is adjacent to the second through-hole 36-2. The third lower inner peripheral-side adjacent area 54-3 of the plurality of lower inner peripheral-side adjacent areas 54-1 to 54-6 is disposed closer to the inner peripheral-side than the third through-hole 36-3 and is adjacent to the third through-hole 36-3. The fourth lower inner peripheral-side adjacent area 54-4 of the plurality of lower inner peripheral-side adjacent areas 54-1 to 54-6 is disposed closer to the inner peripheral-side than the fourth through-hole 36-4 and is adjacent to the fourth through-hole 36-4. The fifth lower inner peripheral-side adjacent area 54-5 of the plurality of lower inner peripheral-side adjacent areas 54-1 to 54-6 is disposed closer to the inner peripheral-side than the fifth through-hole 36-5 and is adjacent to the fifth through-hole 36-5. The sixth lower inner peripheral-side adjacent area 54-6 of the plurality of lower inner peripheral-side adjacent areas 54-1 to 54-6 is arranged closer to the inner peripheral-side than the sixth through-hole 36-6 and is adjacent to the sixth through-hole 36-6. The lower opening 53 exposes all of the plurality of lower inner peripheral-side adjacent areas 54-1 to 54-6 to the internal space 7.

As illustrated in FIG. 5B, the upper rotor-end plate 52 has an upper opening 55 and a plurality of protrusions 56-1 to 56-6. The upper opening 55 is formed in a circular shape. The upper opening 55 exposes the upper end of the shaft 3 to the internal space 7 when the rotor 21 is fixed to the shaft 3. In the upper opening 55, inner peripheral-side parts of the upper rotor-end face 35 side upper ends of the plurality of through-holes 36-1 to 36-6 are respectively open to the internal space 7, thus respectively allowing communication of the plurality of through-holes 36-1 to 36-6 with the internal space 7. The upper opening 55 also exposes all of a plurality of upper inner peripheral-side adjacent areas 43-1 to 43-6 to the internal space 7.

The plurality of protrusions 56-1 to 56-6 respectively cover outer peripheral-side parts of the upper ends of the plurality of through-holes 36-1 to 36-6. That is, the first protrusion 56-1 of the plurality of protrusions 56-1 to 56-6 covers outer peripheral-side part of the upper rotor-end face 35 side upper end of the first through-hole 36-1. The second protrusion 56-2 of the plurality of protrusions 56-1 to 56-6 covers outer peripheral-side part of the upper end of the second through-hole 36-2. The third protrusion 56-3 of the plurality of protrusions 56-1 to 56-6 covers outer peripheral-side part of the upper end of the third through-hole 36-3. The fourth protrusion 56-4 of the plurality of protrusions 56-1 to 56-6 covers outer peripheral-side part of the upper end of the fourth through-hole 36-4. The fifth protrusion 56-5 of the plurality of protrusions 56-1 to 56-6 covers outer peripheral-side part of the upper end of the fifth through-hole 36-5. The sixth protrusion 56-6 of the plurality of protrusions 56-1 to 56-6 covers outer peripheral-side part of the upper end of the sixth through-hole 36-6.

The compressor of the second embodiment operates in the same manner as the compressor 1 of the first embodiment described above. As with the upper rotor-end plate 33 described above, because the plurality of upper inner peripheral-side adjacent areas 43-1 to 43-6 are exposed to the internal space 7, the upper rotor-end plate 52 is less likely to interfere with a high-pressure refrigerant gas obliquely flowing out toward the inner periphery side from the upper ends of the plurality of through-holes 36-1 to 36-6. In the upper rotor-end plate 52, because the plurality of upper inner peripheral-side adjacent areas 43-1 to 43-6 are exposed to the internal space 7, channels connecting the upper part and the lower part of a motor unit 6 via the plurality of through-holes 36-1 to 36-6 can be shortened by an amount corresponding to the thickness of the upper rotor-end plate 52. Consequently, the upper rotor-end plate 52 can reduce resistance of the high-pressure refrigerant gas flowing out from the upper end of the first through-hole 36-1 and can reduce pressure loss when the high-pressure refrigerant gas flows out from the first through-hole 36-1.

Figure 6:
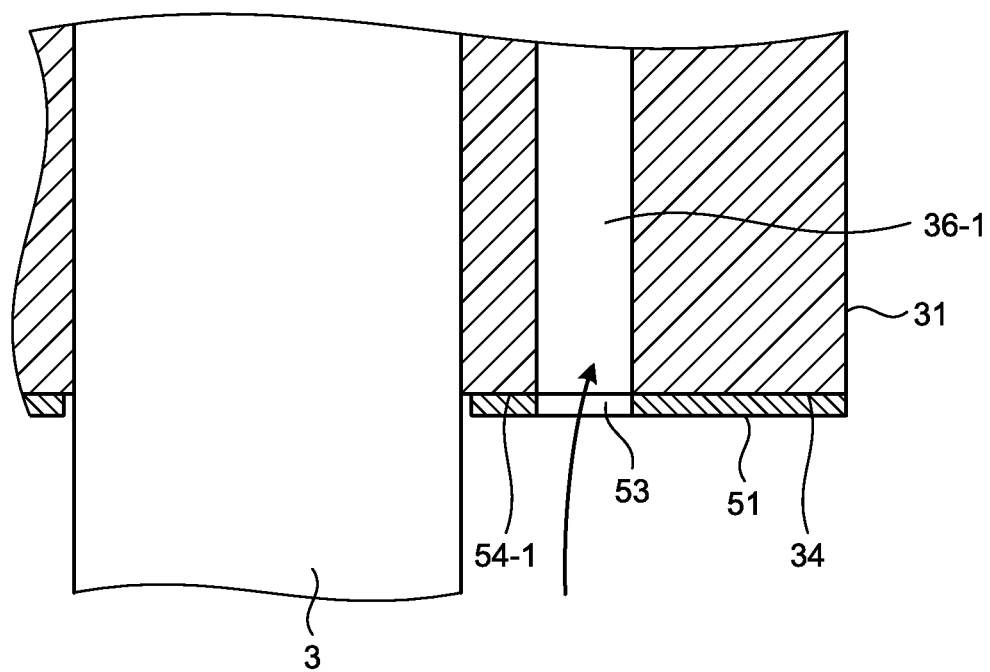
FIG. 6 is an enlarged cross-sectional view illustrating the vicinity of the lower end of the first through-hole.

FIG. 6 is an enlarged cross-sectional view illustrating the vicinity of the lower end of the first through-hole 36-1. The high-pressure refrigerant gas that has flowed out from the compressed refrigerant discharge hole 18 rises along the shaft 3, thereby obliquely advancing from the shaft 3 side toward the outer peripheral-side, and entering the inside of the first through-hole 36-1, as illustrated in FIG. 6. Because the plurality of lower inner peripheral-side adjacent areas 54-1 to 54-6 are exposed to the internal space 7, the lower rotor-end plate 51 is less likely to interfere with the high-pressure refrigerant gas obliquely entering the inside of the first through-hole 36-1 from the shaft 3 side. Therefore, the motor unit 6 of the compressor of the second embodiment can reduce resistance received when the high-pressure refrigerant gas enters the inside of the first through-hole 36-1 from the lower part of the motor unit 6 in the internal space 7 and can reduce pressure loss when the high-pressure refrigerant gas enters the inside of the first through-hole 36-1. In the compressor of the second embodiment, because the plurality of lower inner peripheral-side adjacent areas 54-1 to 54-6 are exposed, the channel connecting the lower part and the upper part of the motor unit 6 via the plurality of through-holes 36-1 to 36-6 can be shortened by the amount corresponding to the thickness of the lower rotor-end plate 51. That is, the compressor of the second embodiment can shorten the channels connecting the lower part and the upper part of the motor unit 6 via the plurality of through-holes 36-1 to 36-6, in comparison with the compressor 1 of the first embodiment described above in which the plurality of lower inner peripheral-side adjacent areas 54-1 to 54-6 are covered. By virtue of the shortened channels, the compressor of the second embodiment can reduce the channel resistance of the high-pressure refrigerant gas passing through the channels and can reduce pressure loss when the high-pressure refrigerant gas passes through the channels. The compressor of the second embodiment reduces pressure loss when the high-pressure refrigerant gas passes through the channels thereof, thereby inhibiting a decrease in the pressure of the refrigerant discharged into the subsequent apparatus, thus making it possible to compress the refrigerant highly efficiently.

Advantageous Effects of Compressor of Second Embodiment

In the compressor of the second embodiment, the plurality of lower inner peripheral-side adjacent areas 54-1 to 54-6 of the lower rotor-end face 34 and the plurality of upper inner peripheral-side adjacent areas 43-1 to 43-6 of the upper rotor-end face 35 are both exposed to the internal space 7. In such a compressor, because the plurality of lower inner peripheral-side adjacent areas 54-1 to 54-6 are exposed to the internal space 7, the channel connecting the lower part and the upper part of the motor unit 6 via the plurality of through-holes 36-1 to 36-6 can be shortened by the amount corresponding to the thickness of the lower rotor-end plate 32. Therefore, in comparison with the compressor 1 of the first embodiment described above, the compressor of the second embodiment can further reduce the channel resistance of the high-pressure refrigerant gas passing through the channel and can reduce pressure loss when the high-pressure refrigerant gas passes through the channel. In the compressor of the second embodiment, because pressure loss when the high-pressure refrigerant gas passes through the channel thereof is further reduced, the high-pressure refrigerant gas can be discharged with higher efficiency, making it possible to further improve the efficiency of a refrigeration cycle in which this compressor is provided.

In addition, the lower rotor-end plate 51 of the compressor of the second embodiment has the one lower opening 53. The lower opening 53 allows communication of all of the plurality of through-holes 36-1 to 36-6 with the internal space 7, and exposes the plurality of lower inner peripheral-side adjacent areas 54-1 to 54-6 to the internal space 7. In the lower rotor-end plate 51, the lower opening 53 is formed from one hole and, therefore, this lower rotor-end plate can be manufactured more easily than the lower rotor-end plate 32 of the compressor 1 of the first embodiment described above. Such a compressor can be easily manufactured because the lower rotor-end plate 51 is manufactured easily.

In addition, the upper rotor-end plate 52 of the compressor of the second embodiment has one upper opening 55 formed therein. The upper opening 55 allows communication of all of the plurality of through-holes 36-1 to 36-6 with the internal space 7 and exposes the plurality of upper inner peripheral-side adjacent areas 43-1 to 43-6 to the internal space 7. In the upper rotor-end plate 52, the upper opening 55 is formed from one hole and, therefore, this upper rotor-end plate can be manufactured more easily than the upper rotor-end plate 33 of the compressor 1 of the first embodiment described above. Such a compressor can be easily manufactured because the upper rotor-end plate 52 is manufactured easily.

In addition, the upper rotor-end plate 52 of the compressor 1 of the second embodiment has the plurality of protrusions 56-1 to 56-6 respectively covering the outer peripheral-side parts of the upper rotor-end face 35 side upper ends of the plurality of through-holes 36-1 to 36-6. The plurality of protrusions 56-1 to 56-6 respectively cover the outer peripheral-side parts of the upper ends of the plurality of through-holes 36-1 to 36-6, thereby inhibiting the refrigerating machine oil accumulated on the outer peripheral-sides of the plurality of through-holes 36-1 to 36-6 from being supplied to the space above the motor unit 6 in the internal space 7. In the compressor of the second embodiment, the refrigerating machine oil is inhibited from being supplied to the space above the motor unit 6 in the internal space 7, and thereby an amount of refrigerating machine oil discharged into the subsequent apparatus together with the refrigerant can be reduced. In such a compressor, because the plurality of upper inner peripheral-side adjacent areas 43-1 to 43-6 are exposed to the internal space 7 even in a case where the plurality of protrusions 56-1 to 56-6 are formed, an increase in pressure loss in the channel connecting the lower part and the upper part of the motor unit 6 via the plurality of through-holes 36-1 to 36-6 can be inhibited.

Third Embodiment

Figure 7A:
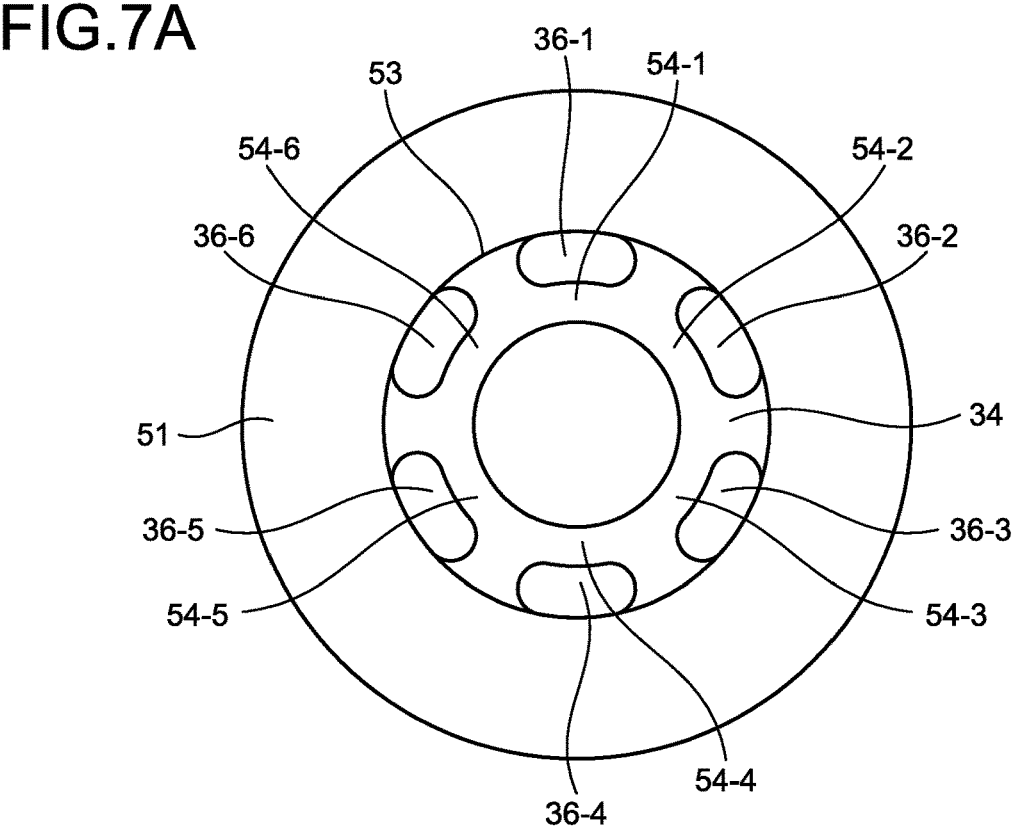
FIG. 7A is a bottom view illustrating the rotor of the compressor of a third embodiment.
Figure 7B:
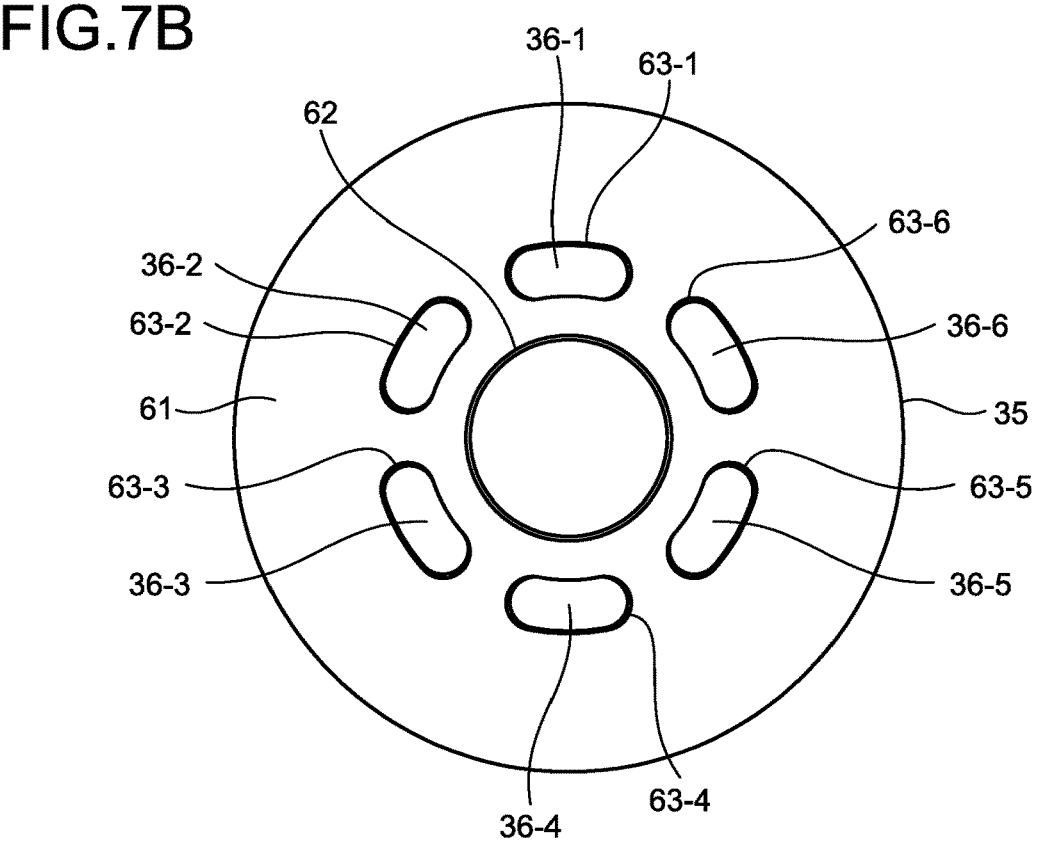
FIG. 7B is a top view illustrating the rotor of the compressor of the third embodiment.

As illustrated in FIG. 7, in a compressor of the third embodiment, the upper rotor-end plate 52 of the compressor 1 of the second embodiment described above is replaced by an upper rotor-end plate 61. FIG. 7A is a bottom view illustrating a rotor 21 of the compressor of the third embodiment, and FIG. 7B is a top view illustrating the rotor 21 of the compressor of the third embodiment. As with the compressor of the second embodiment, the compressor of the third embodiment includes a lower rotor-end plate 51, as illustrated in FIG. 7A. As illustrated in FIG. 7B, the upper rotor-end plate 61 has an upper center hole 62 and a plurality of upper openings 63-1 to 63-6. The upper center hole 62 is formed in the center of the upper rotor-end plate 61. The upper center hole 62 exposes the upper end of the shaft 3 to an internal space 7 when the rotor 21 is fixed to the shaft 3.

The plurality of upper openings 63-1 to 63-6 are formed around the upper center hole 62. The plurality of upper openings 63-1 to 63-6 are formed to have the same shape as the cross section of a plurality of through-holes 36-1 to 36-6 crossing a plane orthogonal to the rotation axis of the shaft 3. In the plurality of upper openings 63-1 to 63-6, all of the upper rotor-end face 35 side upper ends of the plurality of through-holes 36-1 to 36-6 are respectively open to the internal space 7, thus respectively allowing communication of the plurality of through-holes 36-1 to 36-6 with the internal space 7. Although not illustrated, the upper rotor-end plate 61 covers all of a plurality of upper inner peripheral-side adjacent areas 43-1 to 43-6 of an upper rotor-end face 35.

That is, in the first upper opening 63-1 of the plurality of upper openings 63-1 to 63-6, the upper rotor-end face 35 side entire upper end of the first through-hole 36-1 is open to the internal space 7. In addition, the first upper opening 63-1 covers the entire area adjacent to the first through-hole 36-1 of the upper rotor-end face 35. In the second upper opening 63-2 of the plurality of upper openings 63-1 to 63-6, the entire upper end of the second through-hole 36-2 is open to the internal space 7. In addition, the second upper opening 63-2 covers the entire area adjacent to the second through-hole 36-2 of the upper rotor-end face 35.

In the third upper opening 63-3 of the plurality of upper openings 63-1 to 63-6, the entire upper end of the third through-hole 36-3 is open to the internal space 7. In addition, the third upper opening 63-3 covers the entire area adjacent to the third through-hole 36-3 of the upper rotor-end face 35. In the fourth upper opening 63-4 of the plurality of upper openings 63-1 to 63-6, the entire upper end of the fourth through-hole 36-4 is open to the internal space 7. In addition, the fourth upper opening 63-4 covers the entire area adjacent to the fourth through-hole 36-4 of the upper rotor-end face 35.

In the fifth upper opening 63-5 of the plurality of upper openings 63-1 to 63-6, the entire upper end of the fifth through-hole 36-5 is open to the internal space 7. In addition, the fifth upper opening 63-5 covers the entire area adjacent to the fifth through-hole 36-5 of the upper rotor-end face 35. In the sixth upper opening 63-6 of the plurality of upper openings 63-1 to 63-6, the entire upper end of the sixth through-hole 36-6 is open to the internal space 7. In addition, the sixth upper opening 63-6 covers the entire area adjacent to the sixth through-hole 36-6 of the upper rotor-end face 35.

The compressor of the third embodiment operates in the same manner as the compressor 1 of the first embodiment described above. Therefore, in the compressor of the third embodiment, because the plurality of lower inner peripheral-side adjacent areas 54-1 to 54-6 are exposed to the internal space 7, pressure loss when a high-pressure refrigerant gas passes through the plurality of through-holes 36-1 to 36-6 can be reduced, as with the compressor of the second embodiment described above. Accordingly, the compressor according to the third embodiment can compress a refrigerant highly efficiently.

Compressor of First Comparative Example

Figure 8A:
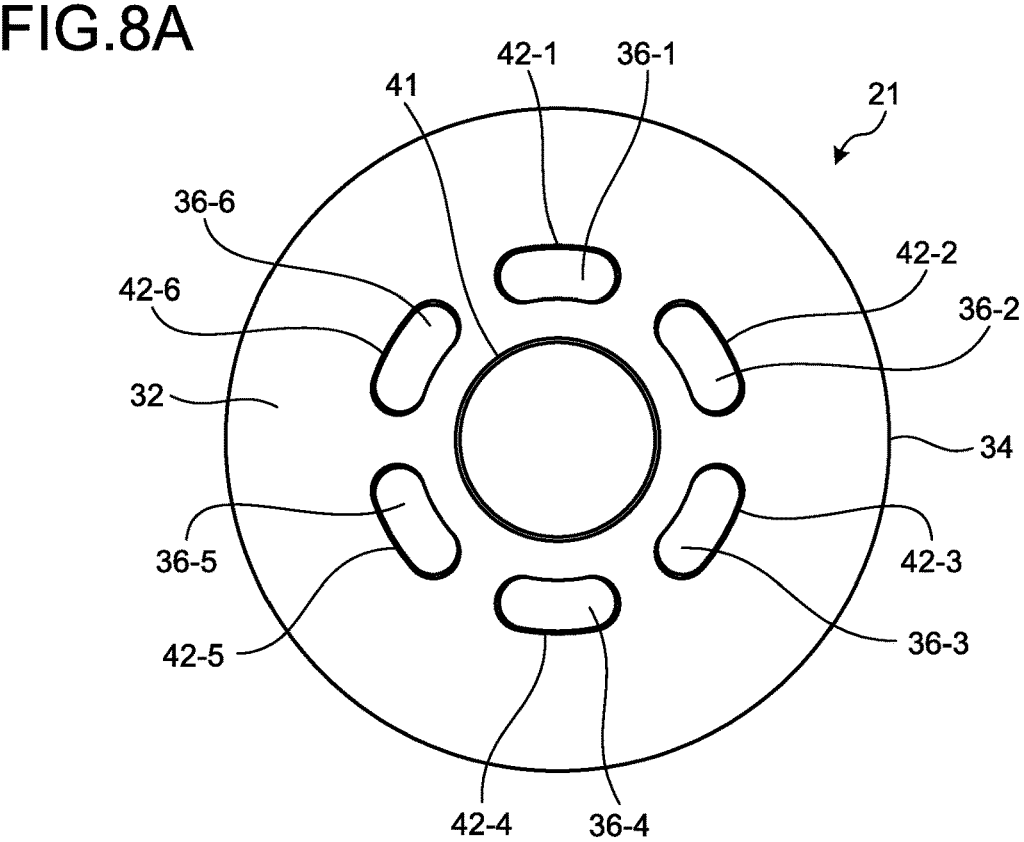
FIG. 8A is a bottom view illustrating the rotor of a compressor of the first comparative example.
Figure 8B:
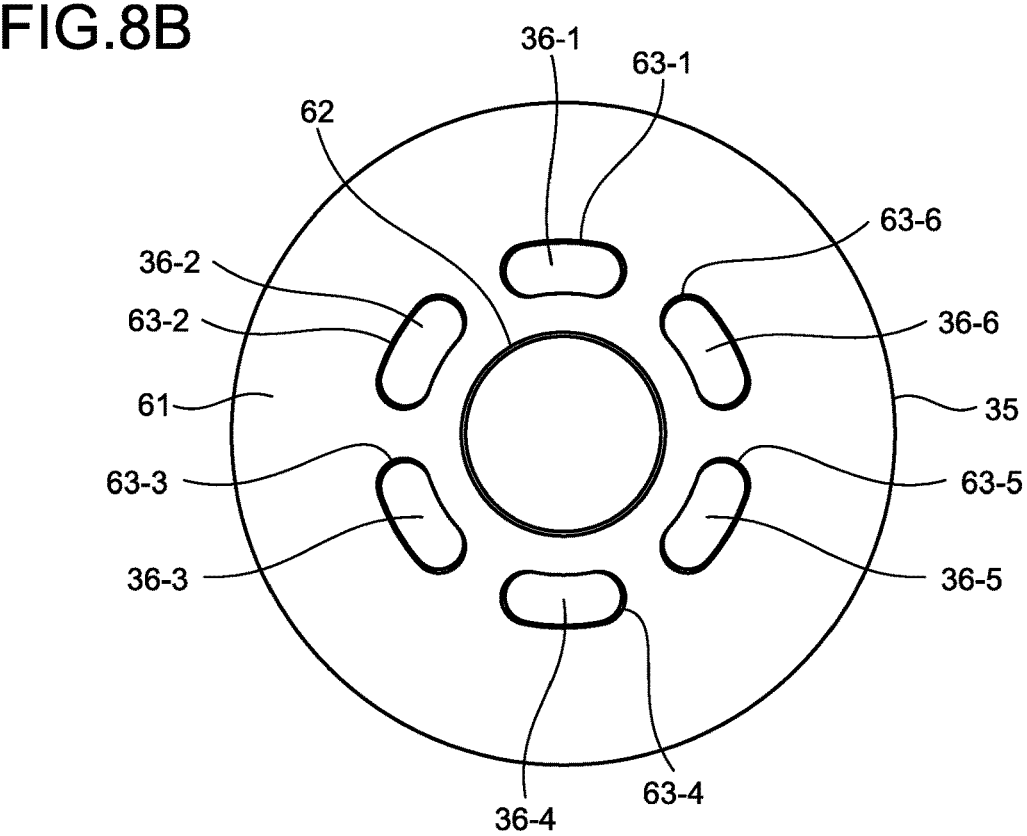
FIG. 8B is a top view illustrating the rotor of the compressor of the first comparative example.

As illustrated in FIG. 8, in the compressor of the first comparative example, the upper rotor-end plate 33 of the compressor 1 of the first embodiment described above is replaced by the upper rotor-end plate 61 of the compressor of the third embodiment described above. FIG. 8A is a bottom view illustrating a rotor of the compressor of the first comparative example, and FIG. 8B is a top view illustrating the rotor of the compressor of the first comparative example. As with the compressor 1 of the first embodiment described above, the compressor of the first comparative example includes a lower rotor-end plate 32, and a plurality of lower inner peripheral-side adjacent areas 54-1 to 54-6 of a lower rotor-end face 34 are covered with the lower rotor-end plate 32, as illustrated in FIG. 8A. As with the compressor of the third embodiment described above, in the compressor of the first comparative example, all of areas adjacent to a plurality of through-holes 36-1 to 36-6 in an upper rotor-end face 35 are covered with an upper rotor-end plate 61, as illustrated in FIG. 8B. That is, in the compressor of the first comparative example, a plurality of upper inner peripheral-side adjacent areas 43-1 to 43-6 of the upper rotor-end face 35 are covered with the upper rotor-end plate 61, although not illustrated. Therefore, in the compressor of the first comparative example, both the plurality of lower inner peripheral-side adjacent areas 54-1 to 54-6 and the plurality of upper inner peripheral-side adjacent areas 43-1 to 43-6 are not exposed to an internal space 7.

[Compressor of Second Comparative Example]

Figure 9A:
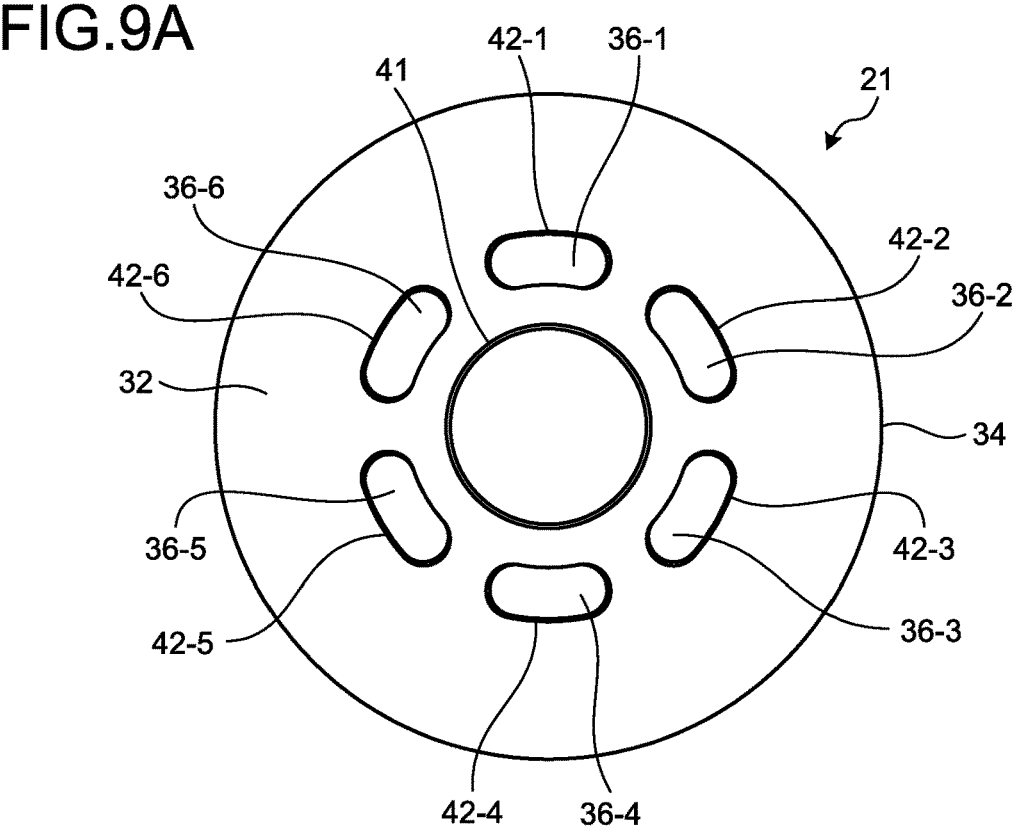
FIG. 9A is a bottom view illustrating the rotor of a compressor of the second comparative example.
Figure 9B:
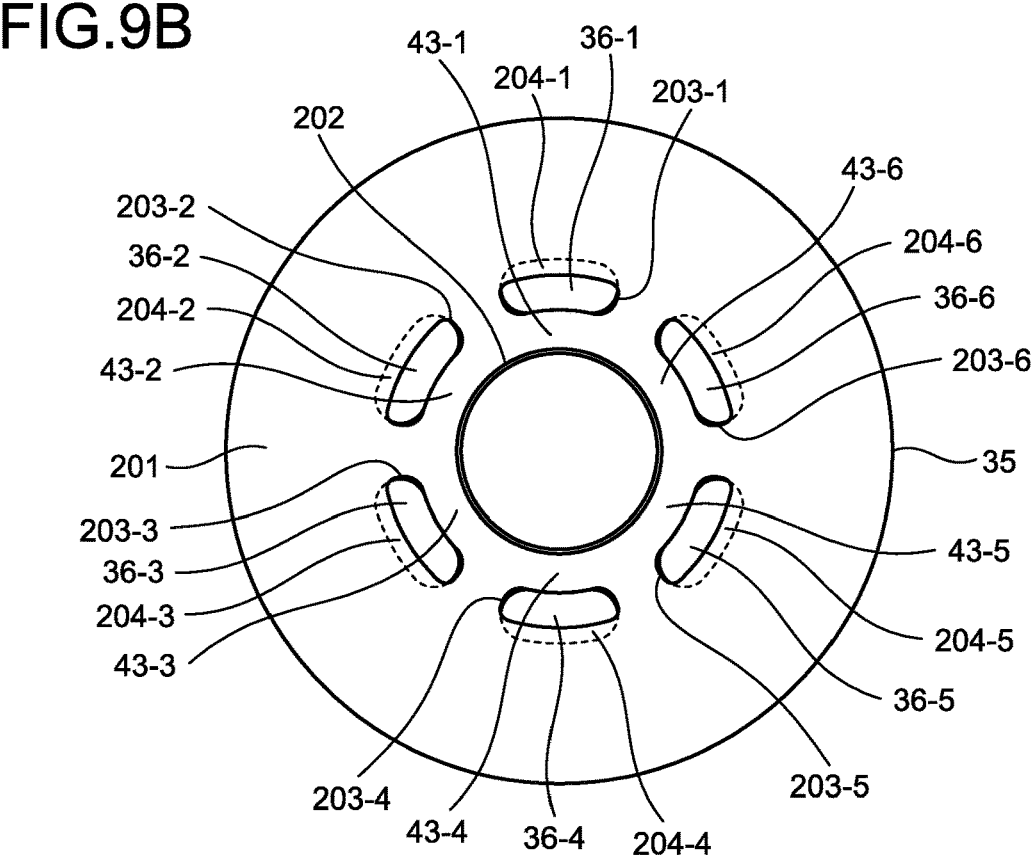
FIG. 9B is a top view illustrating the rotor of the compressor of the second comparative example.

As illustrated in FIG. 9, in the compressor of the second comparative example, the upper rotor-end plate 33 of the compressor 1 of the first embodiment described above is replaced by an upper rotor-end plate 201. FIG. 9A is a bottom view illustrating a rotor of the compressor of the second comparative example, and FIG. 9B is a top view illustrating the rotor of the compressor of the second comparative example. As with the compressor 1 of the first embodiment described above, a lower rotor-end plate of the compressor of the second comparative example includes a lower rotor-end plate 32, and a plurality of lower inner peripheral-side adjacent areas 54-1 to 54-6 of a lower rotor-end face 34 are covered with the lower rotor-end plate 32, as illustrated in FIG. 9A. As illustrated in FIG. 9B, the upper rotor-end plate 201 has an upper center hole 202, a plurality of upper openings 203-1 to 203-6, and a plurality of protrusions 204-1 to 204-6. The upper center hole 202 is formed in the center of the upper rotor-end plate 201. The upper center hole 202 exposes the upper end of a shaft 3 to an internal space 7 when the rotor 21 is fixed to the shaft 3.

The plurality of upper openings 203-1 to 203-6 are formed around the upper center hole 202. In the plurality of upper openings 203-1 to 203-6, parts of the upper rotor-end face 35 side upper ends of the plurality of through-holes 36-1 to 36-6 are respectively open to the internal space 7, thus respectively allowing communication of the plurality of through-holes 36-1 to 36-6 with the internal space 7. A plurality of protrusions 204-1 to 204-6 are arranged on the outer peripheral-side of the plurality of upper openings 203-1 to 203-6, respectively. The plurality of protrusions 204-1 to 204-6 respectively cover outer peripheral-side parts of the upper rotor-end face 35 side upper ends of the plurality of through-holes 36-1 to 36-6.

That is, in the first upper opening 203-1 of the plurality of upper openings 203-1 to 203-6, the entire upper end of the first through-hole 36-1 is open to the internal space 7. In addition, the first upper opening 203-1 covers the entire area adjacent to the first through-hole 36-1 of the upper rotor-end face 35. The first protrusion 204-1 of the plurality of protrusions 204-1 to 204-6 covers outer peripheral-side part of the upper end of the first through-hole 36-1.

In the second upper opening 203-2 of the plurality of upper openings 203-1 to 203-6, the entire upper end of the second through-hole 36-2 is open to the internal space 7. In addition, the second upper opening 203-2 covers the entire area adjacent to the second through-hole 36-2 of the upper rotor-end face 35. The second protrusion 204-2 of the plurality of protrusions 204-1 to 204-6 covers outer peripheral-side part of the upper end of the second through-hole 36-2.

In the third upper opening 203-3 of the plurality of upper openings 203-1 to 203-6, the entire upper end of the third through-hole 36-3 is open to the internal space 7. In addition, the third upper opening 203-3 covers the entire area adjacent to the third through-hole 36-3 of the upper rotor-end face 35. The third protrusion 204-3 of the plurality of protrusions 204-1 to 204-6 covers outer peripheral-side part of the upper end of the third through-hole 36-3.

In the fourth upper opening 203-4 of the plurality of upper openings 203-1 to 203-6, the entire upper end of the fourth through-hole 36-4 is open to the internal space 7. In addition, the fourth upper opening 203-4 covers the entire area adjacent to the fourth through-hole 36-4 of the upper rotor-end face 35. The fourth protrusion 204-4 of the plurality of protrusions 204-1 to 204-6 covers outer peripheral-side part of the upper end of the fourth through-hole 36-4.

In the fifth upper opening 203-5 of the plurality of upper openings 203-1 to 203-6, the entire upper end of the fifth through-hole 36-5 is open to the internal space 7. In addition, the fifth upper opening 203-5 covers the entire area adjacent to the fifth through-hole 36-5 of the upper rotor-end face 35. The fifth protrusion 204-5 of the plurality of protrusions 204-1 to 204-6 covers outer peripheral-side part of the upper end of the fifth through-hole 36-5.

In the sixth upper opening 203-6 of the plurality of upper openings 203-1 to 203-6, the entire upper end of the sixth through-hole 36-6 is open to the internal space 7. In addition, the sixth upper opening 203-6 covers the entire area adjacent to the sixth through-hole 36-6 of the upper rotor-end face 35. The sixth protrusion 204-6 of the plurality of protrusions 204-1 to 204-6 covers outer peripheral-side part of the upper end of the sixth through-hole 36-6.

In the compressor of the second comparative example, the plurality of lower inner peripheral-side adjacent areas 54-1 to 54-6 of the lower rotor-end face 34 are covered with the lower rotor-end plate 32, and the plurality of upper inner peripheral-side adjacent areas 43-1 to 43-6 of the upper rotor-end face 35 are covered with the upper rotor-end plate 201. Therefore, in the compressor of the second comparative example, both the plurality of lower inner peripheral-side adjacent areas 54-1 to 54-6 and the plurality of upper inner peripheral-side adjacent areas 43-1 to 43-6 are not exposed to the internal space 7.

Figure 10:
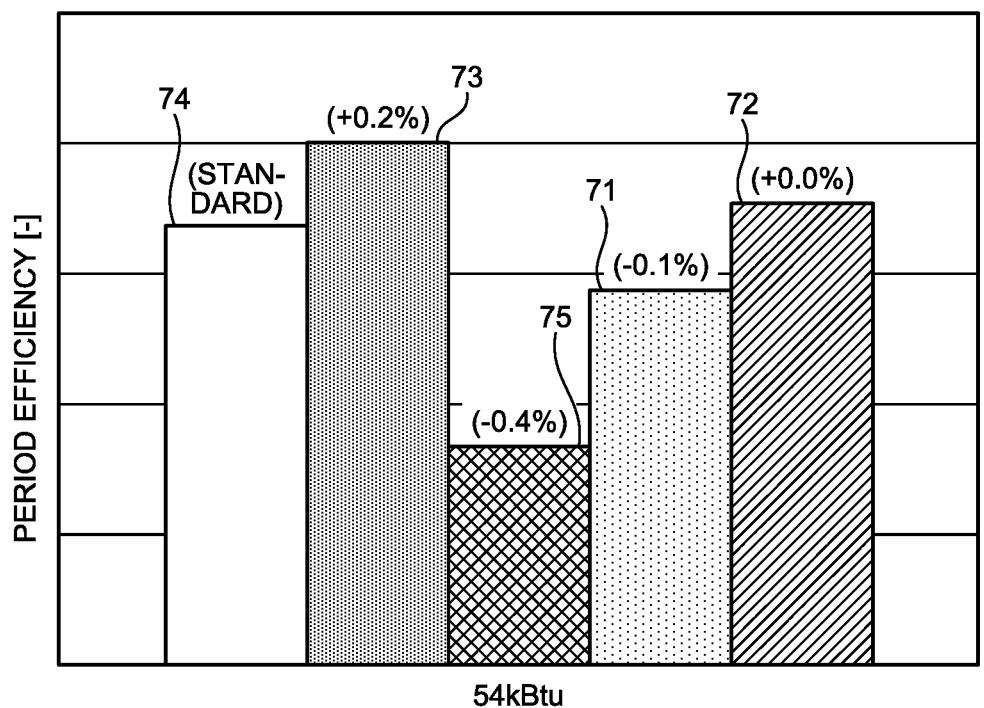
FIG. 10 illustrates a bar graph indicating period efficiency when each of the compressors of the first embodiment to the third embodiment is installed in a refrigeration cycle apparatus having a cooling capacity of 54 kBtu and period efficiency when each of the compressors of the first comparative example to the second comparative example is installed in the refrigeration cycle apparatus having a cooling capacity of 54 kBtu.

FIG. 10 illustrates a bar graph indicating period efficiency when each of the compressors of the first embodiment to the third embodiment is installed in a refrigeration cycle apparatus having a cooling capacity of 54 kBtu and period efficiency when each of the compressors of the first comparative example to the second comparative example is installed in the refrigeration cycle apparatus having a cooling capacity of 54 kBtu. The height of a bar 71 in the bar graph of FIG. 10 indicates the period efficiency of the refrigeration cycle apparatus in which the compressor 1 of the first embodiment is provided. The height of a bar 72 indicates the period efficiency of the refrigeration cycle apparatus in which the compressor of the second embodiment is provided. The height of a bar 73 indicates the period efficiency of the refrigeration cycle apparatus in which the compressor of the third embodiment is provided. The height of a bar 74 indicates the period efficiency of the refrigeration cycle apparatus in which the compressor of the first comparative example is provided. The height of a bar 75 indicates the period efficiency of the refrigeration cycle apparatus in which the compressor of the second comparative example is provided.

A comparison between the bar 71 and the bar 75 indicates that the period efficiency of the refrigeration cycle of the compressor 1 of the first embodiment is higher than the period efficiency of the refrigeration cycle of the compressor of the second comparative example. That is, the bar 71 and the bar 75 indicate that the period efficiency is increased by exposing the plurality of upper inner peripheral-side adjacent areas 43-1 to 43-6.

A comparison between the bar 73 and the bar 74 indicates that the period efficiency of the refrigeration cycle of the compressor of the third embodiment is higher than the period efficiency of the refrigeration cycle of the compressor of the first comparative example. That is, the bar 73 and the bar 74 indicate that the period efficiency is increased by exposing the plurality of lower inner peripheral-side adjacent areas 54-1 to 54-6.

Figure 11:
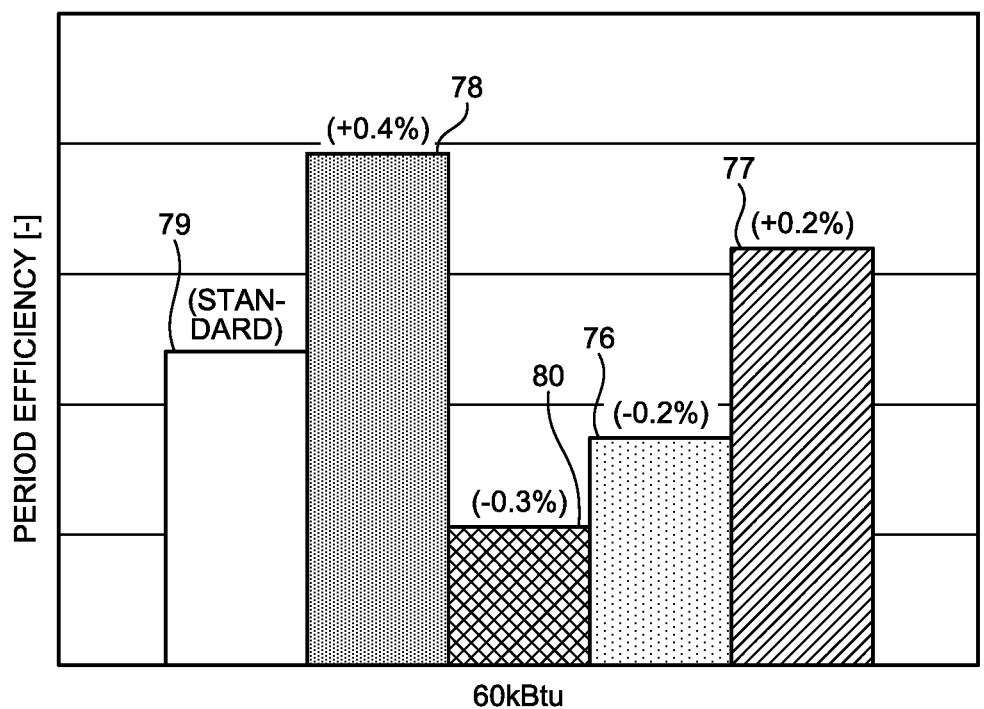
FIG. 11 illustrates a bar graph indicating period efficiency when each of the compressors of the first embodiment to the third embodiment is installed in a refrigeration cycle apparatus having a cooling capacity of 60 kBtu and period efficiency when each of the compressors of the first comparative example to the second comparative example is installed in the refrigeration cycle apparatus having a cooling capacity of 60 kBtu.

FIG. 11 illustrates a bar graph indicating period efficiency when each of the compressors of the first embodiment to the third embodiment is installed in a refrigeration cycle apparatus having a cooling capacity of 60 kBtu and period efficiency when each of the compressors of the first comparative example to the second comparative example is installed in the refrigeration cycle apparatus having a cooling capacity of 60 kBtu. The height of a bar 76 in the bar graph of FIG. 11 indicates the period efficiency of the refrigeration cycle apparatus in which the compressor 1 of the first embodiment is provided. The height of a bar 77 indicates the period efficiency of the refrigeration cycle apparatus in which the compressor of the second embodiment is provided. The height of a bar 78 indicates the period efficiency of the refrigeration cycle apparatus in which the compressor of the third embodiment is provided. The height of a bar 79 indicates the period efficiency of the refrigeration cycle apparatus in which the compressor of the first comparative example is provided. The height of a bar 80 indicates the period efficiency of the refrigeration cycle apparatus in which the compressor of the second comparative example is provided.

A comparison between the bar 76 and the bar 80 indicates that the period efficiency of the refrigeration cycle of the compressor 1 of the first embodiment is higher than the period efficiency of the refrigeration cycle of the compressor of the second comparative example. That is, the bar 76 and the bar 80 indicate that the period efficiency is increased by exposing the plurality of upper inner peripheral-side adjacent areas 43-1 to 43-6.

A comparison between the bar 78 and the bar 79 indicates that the period efficiency of the refrigeration cycle of the compressor of the third embodiment is higher than the period efficiency of the refrigeration cycle of the compressor of the first comparative example. That is, the bar 78 and the bar 79 indicate that the period efficiency is increased by exposing the plurality of lower inner peripheral-side adjacent areas 54-1 to 54-6.

The reason why the period efficiency of each of the compressors of the first to third embodiments is large is that, for example, channel resistance of the channel connecting the upper and lower sides of the motor unit 6 is reduced by exposing the plurality of lower inner peripheral-side adjacent areas 54-1 to 54-6 or the plurality of upper inner peripheral-side adjacent areas 43-1 to 43-6. That is, the bar graph of FIG. 10 and the bar graph of FIG. 11 indicate that channel resistance of a high-pressure refrigerant gas passing through the channel connecting the upper and lower parts of the motor unit 6 via the plurality of through-holes 36-1 to 36-6 is reduced by exposing the plurality of lower inner peripheral-side adjacent areas 54-1 to 54-6. The bar graph of FIG. 10 and the bar graph of FIG. 11 indicate that channel resistance of the high-pressure refrigerant gas passing through the channel connecting the upper and lower parts of the motor unit 6 via the plurality of through-holes 36-1 to 36-6 is reduced by exposing the plurality of upper inner peripheral-side adjacent areas 43-1 to 43-6.

Figure 12:
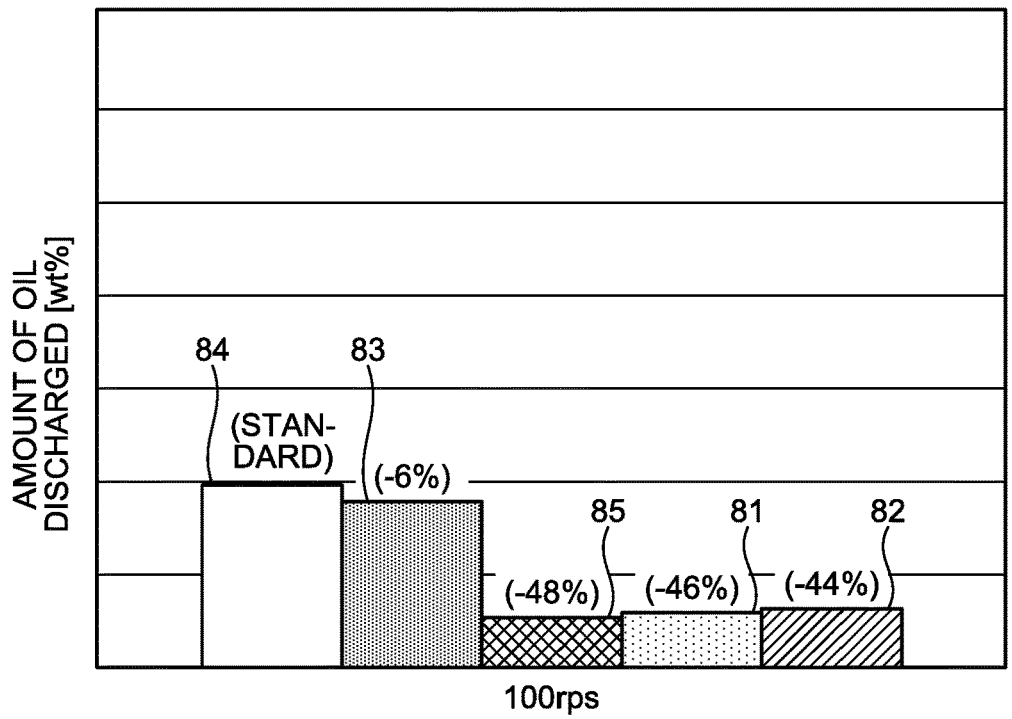
FIG. 12 illustrates a bar graph indicating an amount of oil discharged by each of the compressors of the first embodiment to the third embodiment and an amount of oil discharged by each of the compressors of first comparative example to second comparative example when a shaft rotates at 100 rpm.

FIG. 12 illustrates a bar graph indicating an amount of oil discharged by each of the compressors of the first embodiment to the third embodiment and an amount of oil discharged by each of the compressors of first comparative example to second comparative example when the shaft 3 rotates at 100 rpm. Each amount of oil discharged indicates the concentration of a refrigerating machine oil contained in a refrigerant discharged through the discharge pipe 12. The height of a bar 81 in the bar graph of FIG. 12 indicates the amount of oil discharged by the compressor 1 of the first embodiment. The height of a bar 82 indicates the amount of oil discharged by the compressor of the second embodiment. The height of a bar 83 indicates the amount of oil discharged by the compressor of the third embodiment. The height of a bar 84 indicates the amount of oil discharged by the compressor of the first comparative example. The height of a bar 85 indicates the amount of oil discharged by the compressor of the second comparative example.

A comparison among the bar 81, the bar 84, and the bar 85 indicates that the amount of oil discharged by the compressor 1 of the first embodiment and the amount of oil discharged by the compressor of the second comparative example are smaller than the amount of oil discharged by the compressor of the first comparative example when the shaft 3 rotates at 100 rpm. All of the compressor 1 of the first embodiment, the compressor of first comparative example and the compressor of second comparative example include the respective lower rotor-end plates 32, and the respective upper rotor-end plates covering the upper rotor-end faces 35 of the respective rotor cores 31 differ from one another. That is, the upper rotor-end plates 33, 201 provided in the compressor 1 of the first embodiment and the compressor of the second comparative example, respectively, have the plurality of protrusions 46-1 to 46-6 and the plurality of protrusions 204-1 to 204-6, respectively, covering outer peripheral side parts of the upper ends of the respective plurality of through-holes 36-1 to 36-6. In contrast this, the upper rotor-end plate 61 provided in the compressor of the first comparative example does not have a plurality of protrusions and, therefore, does not cover the outer peripheral-sides of the upper ends of the plurality of through-holes 36-1 to 36-6. Accordingly, all of the upper ends of the plurality of through-holes 36-1 to 36-6 are open to the internal space 7. Therefore, the bar 81, the bar 84, and the bar 85 indicate that, because the outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

A comparison between the bar 82 and the bar 83 indicates that, when the shaft 3 rotates at 100 rpm, the amount of oil discharged by the compressor of the second embodiment is smaller than the amount of oil discharged by the compressor of the third embodiment. Both the compressor 1 of the second embodiment and the compressor of the third embodiment include the respective lower rotor-end plates 51, and the respective upper rotor-end plates covering the upper rotor-end faces 35 of the respective rotor cores 31 differ from each other. That is, the upper rotor-end plates 52 provided in the compressor of the second embodiment has the plurality of protrusions 56-1 to 56-6 respectively covering outer peripheral side parts of the upper ends of the plurality of through-holes 36-1 to 36-6. In contrast this, the upper rotor-end plate 61 provided in the compressor of the third embodiment does not have a plurality of protrusions and, therefore, does not cover the outer peripheral-sides of the upper ends of the plurality of through-holes 36-1 to 36-6. Accordingly, all of the upper ends of the plurality of through-holes 36-1 to 36-6 are open to the internal space 7. Therefore, the bar 82 and the bar 83 indicate that, because the outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

In short, the bar 81 to the bar 85 indicate that, when the shaft 3 rotates at 100 rpm, the amount of oil discharged by the compressor 1 of the first embodiment, the amount of oil discharged by the compressor of the second embodiment, and the amount of oil discharged by the second comparative example are smaller than the amount of oil discharged by the compressor of the third embodiment and the amount of oil discharged by the first comparative example. Therefore, the bar 81 to the bar 85 indicate that, because the outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

Figure 13:
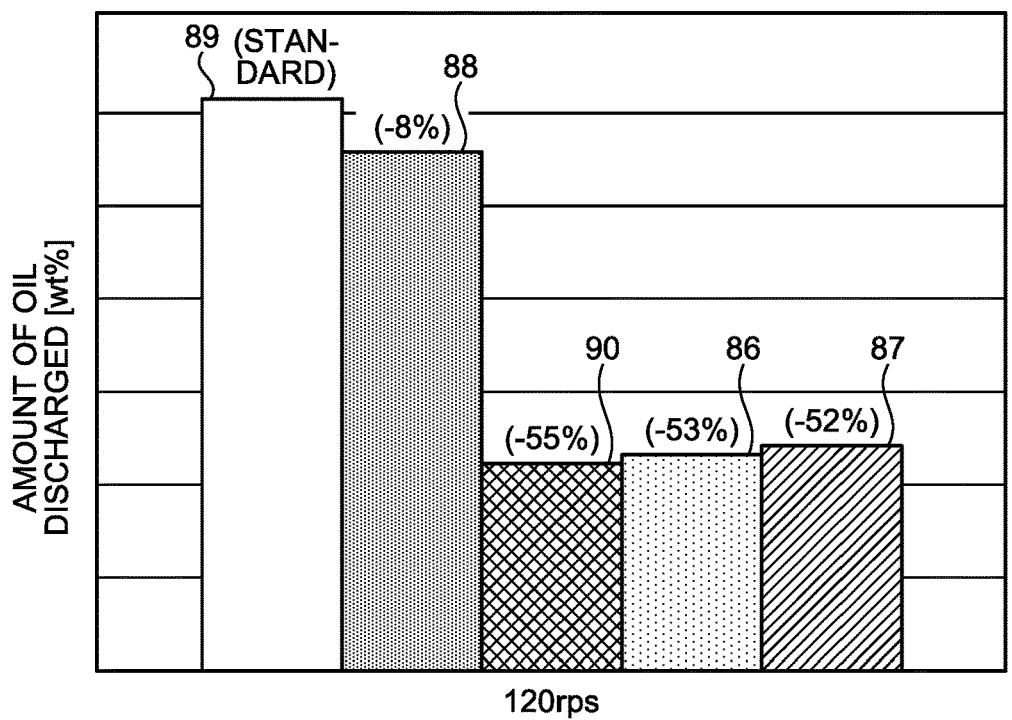
FIG. 13 illustrates a bar graph indicating an amount of oil discharged by each of the compressors of the first embodiment to the third embodiment and an amount of oil discharged by each of the compressors of first comparative example to second comparative example when the shaft rotates at 120 rpm.

FIG. 13 illustrates a bar graph indicating an amount of oil discharged by each of the compressors of the first embodiment to the third embodiment and an amount of oil discharged by each of the compressors of first comparative example to second comparative example when the shaft 3 rotates at 120 rpm. The height of a bar 86 in the bar graph of FIG. 13 indicates the amount of oil discharged by the compressor 1 of the first embodiment. The height of a bar 87 indicates the amount of oil discharged by the compressor of the second embodiment. The height of a bar 88 indicates the amount of oil discharged by the compressor of the third embodiment. The height of a bar 89 indicates the amount of oil discharged by the compressor of first comparative example. The height of a bar 90 indicates the amount of oil discharged by the compressor of the second comparative example.

A comparison among the bar 86, the bar 89, and the bar 90 indicates that, when the shaft 3 rotates at 120 rpm, the amount of oil discharged by the compressor 1 of the first embodiment and the amount of oil discharged by the compressor of the second comparative example are smaller than the amount of oil discharged by the compressor of the first comparative example. That is, as with the bar 81, the bar 84, and the bar 85 of the bar graph in FIG. 12, the bar 86, the bar 89, and the bar 90 indicate that, because outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

A comparison between the bar 87 and the bar 88 indicates that, when the shaft 3 rotates at 120 rpm, the amount of oil discharged by the compressor of the second embodiment is smaller than the amount of oil discharged by the compressor of the third embodiment. That is, as with the bar 82 and the bar 83 of the bar graph in FIG. 12, the bar 87 and the bar 88 indicate that, because outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

In short, the bar 86 to the bar 90 indicate that, when the shaft 3 rotates at 120 rpm, the amount of oil discharged by the compressor 1 of the first embodiment, the amount of oil discharged by the compressor of the second embodiment, and the amount of oil discharged by the second comparative example are smaller than the amount of oil discharged by the compressor of the third embodiment and the amount of oil discharged by the first comparative example. Therefore, the bar 86 to the bar 90 indicate that, because the outer peripheral-side parts of the upper ends of the plurality of through-holes 36-1 to 36-6 are covered, the amount of oil discharged by the compressor is reduced and that the amount of refrigerating machine oil passing from the lower part to the upper part of the motor unit 6 through the plurality of through-holes 36-1 to 36-6 is reduced.

That is, the bar graph in FIG. 12 and the bar graph in FIG. 13 indicate that, because the outer peripheral-side parts of the upper ends of the plurality of through-holes 36-1 to 36-6 are covered, the amount of refrigerating machine oil passing from the lower part to the upper part of the motor unit 6 through the plurality of through-holes 36-1 to 36-6 is reduced whether the number of revolutions of the shaft 3 is 100 rpm or 120 rpm.

Fourth Embodiment

Figure 14:
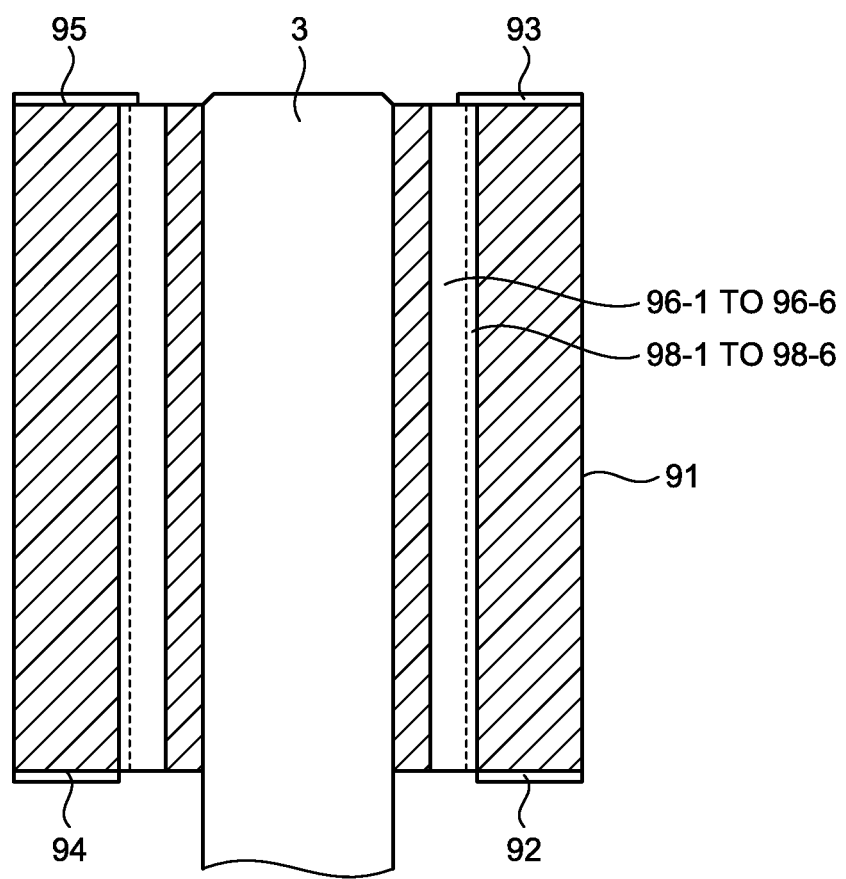
FIG. 14 is a cross-sectional view illustrating the rotor of a compressor according to a fourth embodiment.

In the compressor of the fourth embodiment, as illustrated in FIG. 14, the rotor core 31 of the compressor 1 of the first embodiment described above-is replaced by a rotor core 91, and the lower rotor-end plate 32 is replaced by a lower rotor-end plate 92, and the upper rotor-end plate 33 is replaced by an upper rotor-end plate 93. FIG. 14 is a sectional view illustrating a rotor of the compressor of the fourth embodiment. As with the rotor core 31, the rotor core 91 is formed in a substantially cylindrical shape and is fixed to the shaft 3 as illustrated in FIG. 14 The rotor core 91 further includes a lower rotor-end face 94, an upper rotor-end face 95, and a plurality of through-holes 96-1 to 96-6. The lower rotor-end face 94 is formed at a portion corresponding to one end surface of the cylinder of the rotor core 91 and is formed at a portion, facing a compressor unit 5, of the rotor core 91. The upper rotor-end face 95 is formed at a portion corresponding to the other end surface of the cylinder of the rotor core 91 and is formed on the opposite side of the lower rotor-end face 94 of the rotor core 91. The plurality of through-holes 96-1 to 96-6 are respectively formed along straight lines parallel with the rotation axis of the shaft 3 and are arranged at equal intervals around the shaft 3. The plurality of through-holes 96-1 to 96-6 are formed so as to pass through the lower rotor-end face 94 and the upper rotor-end face 95.

The lower rotor-end plate 92 is formed in a substantially disc shape. The lower rotor-end plate 92 is in close contact with the lower rotor-end face 94 so as to cover the lower rotor-end face 94 of the rotor core 91 and is fixed to the rotor core 91. The upper rotor-end plate 93 is formed in a substantially disc shape. The upper rotor-end plate 93 is in close contact with the upper rotor-end face 95 so as to cover the upper rotor-end face 95 of the rotor core 91 and is fixed to the rotor core 91.

Figure 15A:
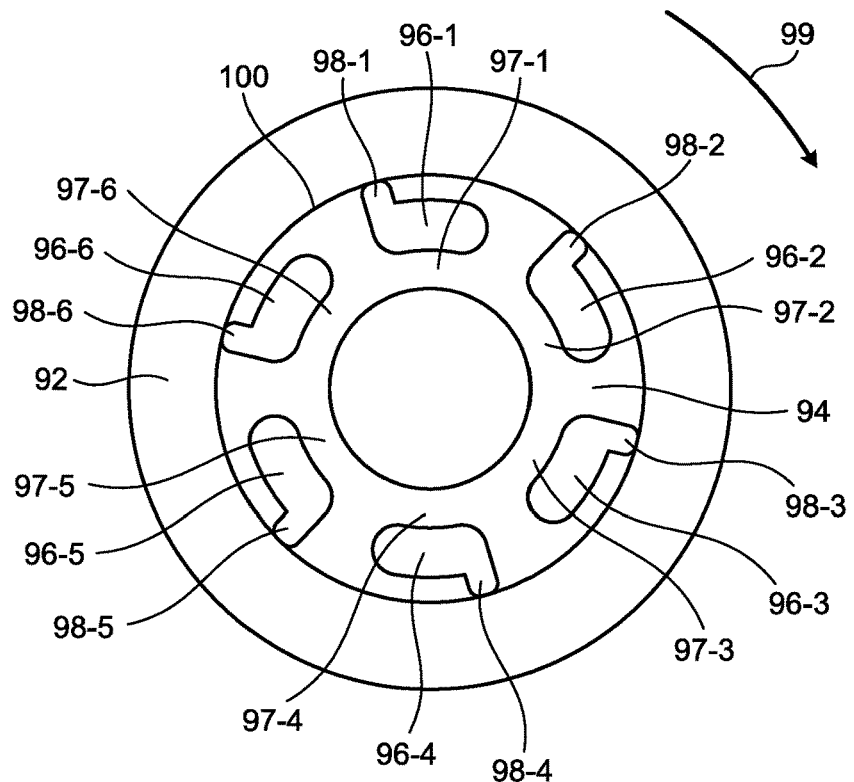
FIG. 15A is a bottom view illustrating the rotor of the compressor of the fourth embodiment.
Figure 15B:
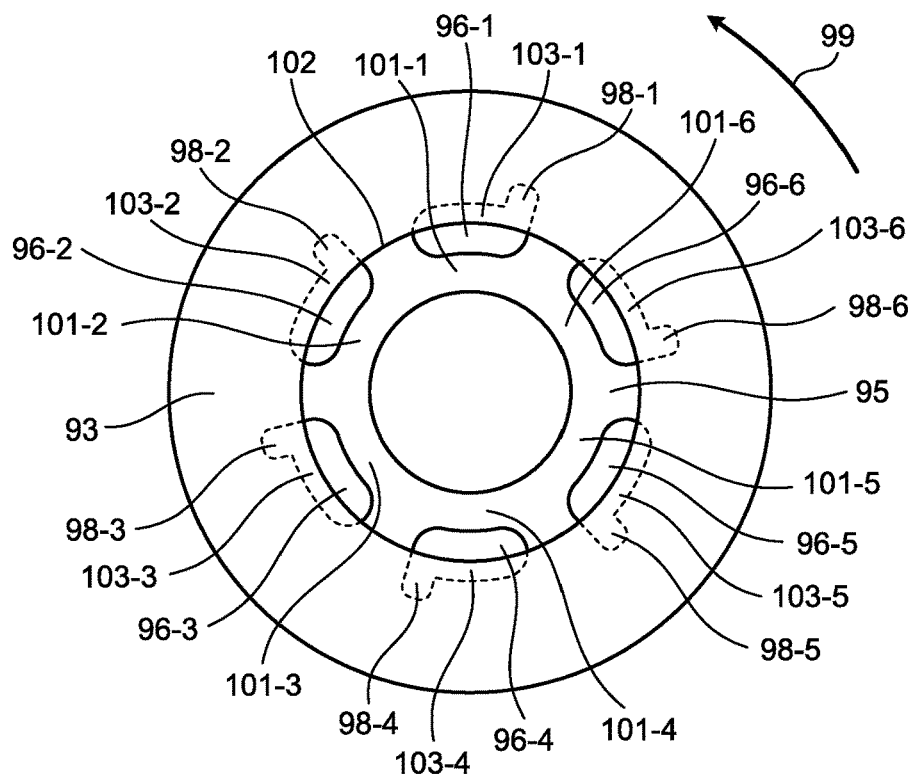
FIG. 15B is a top view illustrating the rotor of the compressor of the fourth embodiment.

FIG. 15A is a bottom view illustrating a rotor of the compressor of the fourth embodiment, and FIG. 15B is a top view illustrating the rotor of the compressor of the fourth embodiment. The lower rotor-end face 94 includes a plurality of lower inner peripheral-side adjacent areas 97-1 to 97-6, as illustrated in FIG. 15A. The plurality of lower inner peripheral-side adjacent areas 97-1 to 97-6 are arranged closer to the inner peripheral-side than the plurality of through-holes 96-1 to 96-6, respectively and are adjacent to the plurality of through-holes 96-1 to 96-6, respectively.

The rotor core 91 has a plurality of grooves 98-1 to 98-6 formed therein. The plurality of grooves 98-1 to 98-6 are formed in the internal-wall surfaces of the plurality of through-holes 96-1 to 96-6, respectively. The plurality of grooves 98-1 to 98-6 are respectively formed so as to connect the lower rotor-end face 94 and the upper rotor-end face 95 (see FIG. 14).

The first groove 98-1 of the plurality of grooves 98-1 to 98-6 is formed in the internal-wall surface of the first through-hole 96-1 of the plurality of through-holes 96-1 to 96-6. In addition, the first groove 98-1 is formed in an outer peripheral-side area of the internal-wall surface of the first through-hole 96-1 and at the rear end, with respect to a rotating direction 99 of the rotor, of the outer peripheral-side area. The second groove 98-2 of the plurality of grooves 98-1 to 98-6 is formed in the internal-wall surface of the second through-hole 96-2 of the plurality of through-holes 96-1 to 96-6. In addition, the second groove 98-2 is formed in an outer peripheral-side area of the internal-wall surface of the second through-hole 96-2 and at the rear end, with respect to the rotating direction 99 of the rotor, of the outer peripheral-side area.

The third groove 98-3 of the plurality of grooves 98-1 to 98-6 is formed in the internal-wall surface of the third through-hole 96-3 of the plurality of through-holes 96-1 to 96-6. In addition, the third groove 98-3 is formed in an outer peripheral-side area of the internal-wall surface of the third through-hole 96-3 and at the rear end, with respect to the rotating direction 99 of the rotor, of the outer peripheral-side area. The fourth groove 98-4 of the plurality of grooves 98-1 to 98-6 is formed in the internal-wall surface of the fourth through-hole 96-4 of the plurality of through-holes 96-1 to 96-6. In addition, the fourth groove 98-4 is formed in an outer peripheral-side area of the internal-wall surface of the fourth through-hole 96-4 and at the rear end, with respect to the rotating direction 99 of the rotor, of the outer peripheral-side area.

The fifth groove 98-5 of the plurality of grooves 98-1 to 98-6 is formed in the internal-wall surface of the fifth through-hole 96-5 of the plurality of through-holes 96-1 to 96-6. In addition, the fifth groove 98-5 is formed in an outer peripheral-side area of the internal-wall surface of the fifth through-hole 96-5 and at the rear end, with respect to the rotating direction 99 of the rotor, of the outer peripheral-side area. The sixth groove 98-6 of the plurality of grooves 98-1 to 98-6 is formed in the internal-wall surface of the sixth through-hole 96-6 of the plurality of through-holes 96-1 to 96-6. In addition, the sixth groove 98-6 is formed in an outer peripheral-side area of the internal-wall surface of the sixth through-hole 96-6 and at the rear end, with respect to the rotating direction 99 of the rotor, of the outer peripheral-side area.

The lower rotor-end plate 92 has a lower opening 100 formed therein. The lower opening 100 is formed in a circular shape. The shaft 3 passes through the lower opening 100 when the rotor core 91 is fixed to the shaft 3. In the lower opening 100, all of the lower ends, on a lower rotor-end face 94 side, of the plurality of through-holes 96-1 to 96-6 are open to an internal space 7, thus respectively allowing communication of the plurality of through-holes 96-1 to 96-6 with the internal space 7. In the lower opening 100, all of the lower ends, on the lower rotor-end face 94 side, of the plurality of grooves 98-1 to 98-6 are open to the internal space 7, thus respectively allowing communication of the plurality of grooves 98-1 to 98-6 with the internal space 7. The lower opening 100 also exposes all of the plurality of lower inner peripheral-side adjacent areas 97-1 to 97-6 to the internal space 7.

The upper rotor-end face 95 includes a plurality of upper inner peripheral-side adjacent areas 101-1 to 101-6, as illustrated in FIG. 15B. The plurality of upper inner peripheral-side adjacent areas 101-1 to 101-6 are arranged closer to the inner peripheral-side than the plurality of through-holes 96-1 to 96-6, respectively and are adjacent to the plurality of through-holes 96-1 to 96-6, respectively.

The upper rotor-end plate 93 has an upper opening 102 and a plurality of protrusions 103-1 to 103-6. The upper opening 102 is formed in a circular shape. The upper opening 102 exposes the upper end of the shaft 3 to the internal space 7 when the rotor core 91 is fixed to the shaft 3. In the upper opening 102, parts of the ends, on an upper rotor-end face 95 side, of the plurality of through-holes 96-1 to 96-6 are open to the internal space 7, thus respectively allowing communication of the plurality of through-holes 96-1 to 96-6 with the internal space 7.

The plurality of protrusions 103-1 to 103-6 respectively cover outer peripheral-side parts of the upper rotor-end face 95 side upper ends of the plurality of through-holes 96-1 to 96-6. In addition, the plurality of protrusions 103-1 to 103-6 respectively cover the entire upper ends, on the upper rotor-end face 95 side, of the plurality of grooves 98-1 to 98-6.

That is, the first protrusion 103-1 of the plurality of protrusions 103-1 to 103-6 covers outer peripheral-side part of the upper rotor-end face 95 side upper end of the first through-hole 96-1 and closes the entire upper end, on the upper rotor-end face 95 side, of the first groove 98-1. The second protrusion 103-2 of the plurality of protrusions 103-1 to 103-6 covers outer peripheral-side part of the upper rotor-end face 95 side upper end of the second through-hole 96-2 and closes the entire upper end, on the upper rotor-end face 95 side, of the second groove 98-2. The third protrusion 103-3 of the plurality of protrusions 103-1 to 103-6 covers outer peripheral-side part of the upper rotor-end face 95 side upper end of the third through-hole 96-3 and closes the entire upper end, on the upper rotor-end face 95 side, of the third groove 98-3.

The fourth protrusion 103-4 of the plurality of protrusions 103-1 to 103-6 covers outer peripheral-side part of the upper rotor-end face 95 side upper end of the fourth through-hole 96-4 and closes the entire upper end, on the upper rotor-end face 95 side, of the fourth groove 98-4. The fifth protrusion 103-5 of the plurality of protrusions 103-1 to 103-6 covers outer peripheral-side part of the upper rotor-end face 95 side upper end of the fifth through-hole 96-5 and closes the entire upper end, on the upper rotor-end face 95 side, of the fifth groove 98-5. The sixth protrusion 103-6 of the plurality of protrusions 103-1 to 103-6 covers outer peripheral-side part of the upper rotor-end face 95 side upper end of the sixth through-hole 96-6 and closes the entire upper end, on the upper rotor-end face 95 side, of the sixth groove 98-6.

Advantageous Effects of Compressor of Fourth Embodiment

In the rotor core 91 of the compressor of the fourth embodiment, the plurality of grooves 98-1 to 98-6 are formed at the rear ends, with respect to the rotating direction 99, of the insides of the plurality of through-holes 96-1 to 96-6, respectively. The upper rotor-end plate 93 is formed so as to close the upper ends, connected to the upper rotor-end face 95, of the plurality of grooves 98-1 to 98-6. In the lower rotor-end plate 92, the plurality of grooves 98-1 to 98-6 are open such that the lower ends, connected to the lower rotor-end face 94, of the plurality of grooves 98-1 to 98-6 communicate with the internal space 7.

According to such a compressor, a high-pressure refrigerant gas containing a refrigerating machine oil, passing through the plurality of through-holes 96-1 to 96-6, is accelerated in the separation of the refrigerant gas and the refrigerating machine oil within the plurality of through-holes 96-1 to 96-6 as the rotor core 91 rotates. As the rotor core rotates, the separated refrigerating machine oil moves toward each of the plurality of grooves 98-1 to 98-6 and accumulates in each of the plurality of grooves 98-1 to 98-6. The compressor of the fourth embodiment has the plurality of protrusions 103-1 to 103-6, thereby, the refrigerating machine oil is inhibited from flowing out into the internal space 7 from the plurality of grooves 98-1 to 98-6, and the amount of refrigerating machine oil supplied to the upper part of the motor unit 6 in the internal space 7 can be reduced. In the compressor of the fourth embodiment, the amount of refrigerating machine oil supplied above the motor unit 6 in the internal space 7 is reduced, and thereby the amount of refrigerating machine oil discharged into the subsequent apparatus together with the refrigerant can be reduced. In the compressor of the fourth embodiment, the amount of refrigerating machine oil discharged is reduced, and thereby the amount of refrigerating machine oil supplied to the lower part of the motor unit 6 in the internal space 7 can be increased, making it possible to return the refrigerating machine oil to the oil sump 8 and appropriately lubricate the compressor unit 5. In addition, the compressor of the fourth embodiment can improve the heat exchange efficiency of the heat exchanger of the refrigeration cycle apparatus by reducing the amount of oil discharged.

In the compressor of the fourth embodiment, the plurality of lower inner peripheral-side adjacent areas 97-1 to 97-6 are exposed. Thereby, as with the compressors of the first and second embodiments described above, pressure loss when the high pressure refrigerant gas enters the insides of the plurality of through-holes 96-1 to 96-6 from the lower part of the motor unit 6 is reduced. In the compressor of the fourth embodiment, the plurality of upper inner peripheral-side adjacent areas 101-1 to 101-6 are exposed. Thereby, as with the compressors of the second and third compressors described above, pressure loss when the high-pressure refrigerant gas flows out from the plurality of through-holes 96-1 to 96-6 can be reduced. In the compressor of the fourth embodiment, the plurality of lower inner peripheral-side adjacent areas 97-1 to 97-6 and the plurality of upper inner peripheral-side adjacent areas 101-1 to 101-6 are exposed, and thereby the channels connecting the lower part and the upper part of the motor unit 6 via the plurality of through-holes 96-1 to 96-6 can be shortened. By virtue of the shortened channels, the compressor of the fourth embodiment can reduce pressure loss of the channels. Therefore, in the compressor of the fourth embodiment, because pressure loss when the high-pressure refrigerant gas passes through the channels is reduced even in a case where the plurality of protrusions 103-1 to 103-6 are formed, an increase in pressure loss of the channels can be inhibited. The compressor of the fourth embodiment can compress the refrigerant highly accurately by inhibiting an increase in pressure loss in the channels.

Incidentally, the compressor unit 5 of the compressor of each of the first to fourth embodiments described above is formed of a rotary compressor, but it may be replaced by a compressor different from the rotary compressor. As an example of such a compressor, a scroll compressor is used. In the compressors of the first to fourth embodiments, even in such an example, a plurality of lower inner peripheral-side adjacent areas or a plurality of upper inner peripheral-side adjacent areas are exposed to an internal space 7, thereby reducing channel resistance in the plurality of through-holes, making it possible to compress a refrigerant highly efficiently.

While the embodiments have been described above, the embodiments are not limited by the foregoing contents. In addition, the compositional elements described above include those that can easily be conceived by a person skilled in the art, those that are substantially identical, and those within the range of so-called equivalence. Furthermore, the compositional elements described above can be combined as appropriate. Furthermore, at least one of various omissions, replacements, and changes of the compositional elements can be made without departing from the spirit of the embodiments.

REFERENCE SIGNS LIST

1 compressor
2 container
5 compressor unit
6 motor unit
7 internal space
21 rotor
22 stator
31 rotor core
32 lower rotor-end plate
33 upper rotor-end plate
34 lower rotor-end face
35 upper rotor-end face
36-1 to 36-6 a plurality of through-holes
42-1 to 42-6 a plurality of lower openings
43-1 to 43-6 a plurality of upper inner peripheral-side adjacent areas
45-1 to 45-6 a plurality of upper openings
46-1 to 46-6 a plurality of protrusions
51 lower rotor-end plate
52 upper rotor-end plate
53 lower opening
54-1 to 54-6 a plurality of lower inner peripheral-side adjacent areas
55 upper opening 56-1 to 56-6 a plurality of protrusions
61 upper rotor-end plate
63-1 to 63-6 a plurality of upper openings
91 rotor core
92 lower rotor-end plate
93 upper rotor-end plate
94 lower rotor-end face
95 upper rotor-end face
96-1 to 96-6 a plurality of through-holes
97-1 to 97-6 a plurality of lower inner peripheral-side adjacent areas
98-1 to 98-6 a plurality of grooves
99 rotating direction
100 lower opening
101-1 to 101-6 a plurality of upper inner peripheral-side adjacent areas
102 upper opening
103-1 to 103-6 a plurality of protrusions

The invention claimed is:

1. A compressor comprising:
a rotor;
a stator that rotates the rotor about a rotation axis;
a compressor unit that compresses a refrigerant by rotation of the rotor; and
a hermetic container that forms an internal space in which the rotor, the stator, and the compressor unit are housed;
wherein the hermetic container comprises a discharging unit configured to discharge the compressed refrigerant to an exterior, and the rotor is disposed between the compressor unit and the discharging unit,
wherein the rotor has
a rotor core that has a plurality of holes through which the refrigerant passes,
a first-end plate that covers a first-end face of the rotor core in which one end of each of the plurality of holes is formed and that comprises a first opening to allow communication of the plurality of holes with the internal space, the first opening being formed such that the one end is open to the internal space, and
a second-end plate that covers a second-end face of the rotor core in which another end of each of the plurality of holes is formed and that comprises a second opening to allow communication of the plurality of holes with the internal space, the second opening having a protrusion covering an area of the another end far from the rotation axis,
wherein at least one of the first opening or the second opening exposes an area of the first-end face or second-end face to the internal space, the area being located at a side, which is close to the rotation axis, of the plurality of holes,
wherein the one end is formed closer to the compressor unit than the another end,
wherein the first opening is formed of one hole allowing communication of all of the plurality of holes with the internal space, the one hole being formed in a circular shape, and
wherein the second opening is formed of another hole allowing communication of all of the plurality of holes with the internal space, the another hole being formed in a circular shape and having a diameter smaller than a diameter of the one hole.

2. The compressor according to claim 1,
wherein the compressor has an opening that opens toward the rotor to allow high-pressure refrigerant gas compressed by the compressor unit to enter into the plurality of holes from the one end.

3. The compressor according to claim 1,
wherein the rotor core has a plurality of grooves formed at respective rears, with respect to a rotating direction of the rotor, of internal-wall surfaces of the plurality of holes, and
the second-end plate is formed so as to close respective ends of the plurality of grooves, the ends being connected to the second-end face.

4. A compressor comprising:
a rotor;
a stator that rotates the rotor about a rotation axis;
a compressor unit that compresses a refrigerant by rotation of the rotor; and
a hermetic container that forms an internal space in which the rotor, the stator, and the compressor unit are housed,
wherein the hermetic container comprises a discharging unit configured to discharge the compressed refrigerant to the exterior, and the rotor is disposed between the compressor unit and the discharging unit,
wherein the rotor has
a rotor core that has a plurality of holes through which the refrigerant passes,
a first-end plate that covers a first-end face of the rotor core in which one end of each of the plurality of holes is formed and that comprises a first opening to allow communication of the plurality of holes with the internal space, the first opening being formed such that the one end is open to the internal space and such that the one end is fully exposed to the internal space, and
a second-end plate that covers a second-end face of the rotor core in which another end of each of the plurality of holes is formed and that comprises a second opening to allow communication of the plurality of holes with the internal space, the second opening having a protrusion covering an area of the another end far from the rotation axis,
wherein at least one of the first opening or the second opening exposes an area of the first-end face or second-end face to the internal space, the area being located at a side, which is close to the rotation axis, of the plurality of holes, and
wherein the one end is formed closer to the compressor unit than the another end.

* * * * *